US011217006B2

(12) United States Patent
van Hoff et al.

(10) Patent No.: US 11,217,006 B2
(45) Date of Patent: Jan. 4, 2022

(54) METHODS AND SYSTEMS FOR PERFORMING 3D SIMULATION BASED ON A 2D VIDEO IMAGE

(71) Applicant: Verizon Patent and Licensing Inc., Arlington, VA (US)

(72) Inventors: Arthur van Hoff, Palo Alto, CA (US); Daniel Kopeinigg, Palo Alto, CA (US); Philip Lee, Palo Alto, CA (US); Solmaz Hajmohammadi, Palo Alto, CA (US); Sourabh Khire, Palo Alto, CA (US); Simion Venshtain, Palo Alto, CA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

(21) Appl. No.: 16/666,338

(22) Filed: Oct. 28, 2019

(65) Prior Publication Data

US 2020/0134911 A1    Apr. 30, 2020

Related U.S. Application Data

(60) Provisional application No. 62/752,331, filed on Oct. 29, 2018.

(51) Int. Cl.
*G06T 15/20*     (2011.01)
*G06T 7/246*     (2017.01)

(52) U.S. Cl.
CPC ............ *G06T 15/205* (2013.01); *G06T 7/248* (2017.01); *G06T 2207/10016* (2013.01); *G06T 2207/20081* (2013.01); *G06T 2207/30196* (2013.01)

(58) Field of Classification Search
CPC ................... G06T 15/205; G06T 7/248; G06T 2207/10016; G06T 2207/20081; G06T 2207/30196; G06T 7/292; G06T 7/251; G06T 2207/20084; G06T 19/00; G06T 13/20
See application file for complete search history.

(56) References Cited

U.S. PATENT DOCUMENTS

| 10,403,050 | B1 * | 9/2019 | Beall | G02B 27/017 |
| 2002/0158873 | A1 * | 10/2002 | Williamson | G06T 17/00 345/427 |
| 2009/0129630 | A1 * | 5/2009 | Gloudemans | G06T 15/20 382/103 |

(Continued)

*Primary Examiner* — Michael Le

(57) ABSTRACT

An exemplary three-dimensional (3D) simulation system accesses a two-dimensional (2D) video image captured by a video capture device and that depicts a bounded real-world scene and a real-world object present within the bounded real-world scene. The 3D simulation system accesses respective 3D models of the bounded real-world scene and the real-world object. Based on the 2D video image, the 3D simulation system tracks a spatial characteristic of the real-world object relative to the bounded real-world scene. Based on the tracked spatial characteristic of the real-world object and the 3D models of the bounded real-world scene and the real-world object, the 3D simulation system generates a 3D simulation of the bounded real-world scene within which the real-world object is simulated in accordance with the tracked spatial characteristic of the real-world object. Corresponding methods and systems are also disclosed.

18 Claims, 14 Drawing Sheets

(56) References Cited

U.S. PATENT DOCUMENTS

| | | | |
|---|---|---|---|
| 2013/0083173 A1* | 4/2013 | Geisner | G09G 3/003 348/51 |
| 2013/0150160 A1* | 6/2013 | El Dokor | A63F 13/79 463/32 |
| 2014/0129935 A1* | 5/2014 | Ovadia Nahon | G06F 3/01 715/716 |
| 2016/0323565 A1* | 11/2016 | van Baarsen | H04N 13/271 |
| 2016/0350599 A1* | 12/2016 | Bataller | G06T 7/13 |
| 2017/0243346 A1* | 8/2017 | Hall | G06K 9/00342 |
| 2017/0318275 A1* | 11/2017 | Khalid | H04N 13/122 |
| 2018/0350084 A1* | 12/2018 | Tamir | G06T 7/292 |
| 2019/0026548 A1* | 1/2019 | Varadarajan | G06K 9/00362 |
| 2019/0026942 A1* | 1/2019 | Zhang | G06T 7/251 |

* cited by examiner

METHODS AND SYSTEMS FOR PERFORMING 3D SIMULATION BASED ON A 2D VIDEO IMAGE

RELATED APPLICATIONS

The present application claims priority under 35 U.S.C. § 119(e) to U.S. Provisional Patent Application No. 62/752,331, filed Oct. 29, 2018. The contents of the provisional patent application are hereby incorporated by reference in their entirety.

BACKGROUND INFORMATION

Various technologies are used to generate three-dimensional ("3D") content configured to be presented to users of the technologies. Examples of such technologies may include, for instance, extended reality technologies (e.g., virtual reality technologies, augmented reality technologies, etc.), 3D entertainment technologies (e.g., 3D television, 3D movies, 3D gaming, etc.), and other technologies used to provide entertainment, educational, vocational, and/or other types of value to users. While certain conventional technologies are well suited to serve certain applications and uses cases, convention 3D content generation technologies leave room for improvement in terms of quality, efficacy, efficiency, ease of implementation, and so forth.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
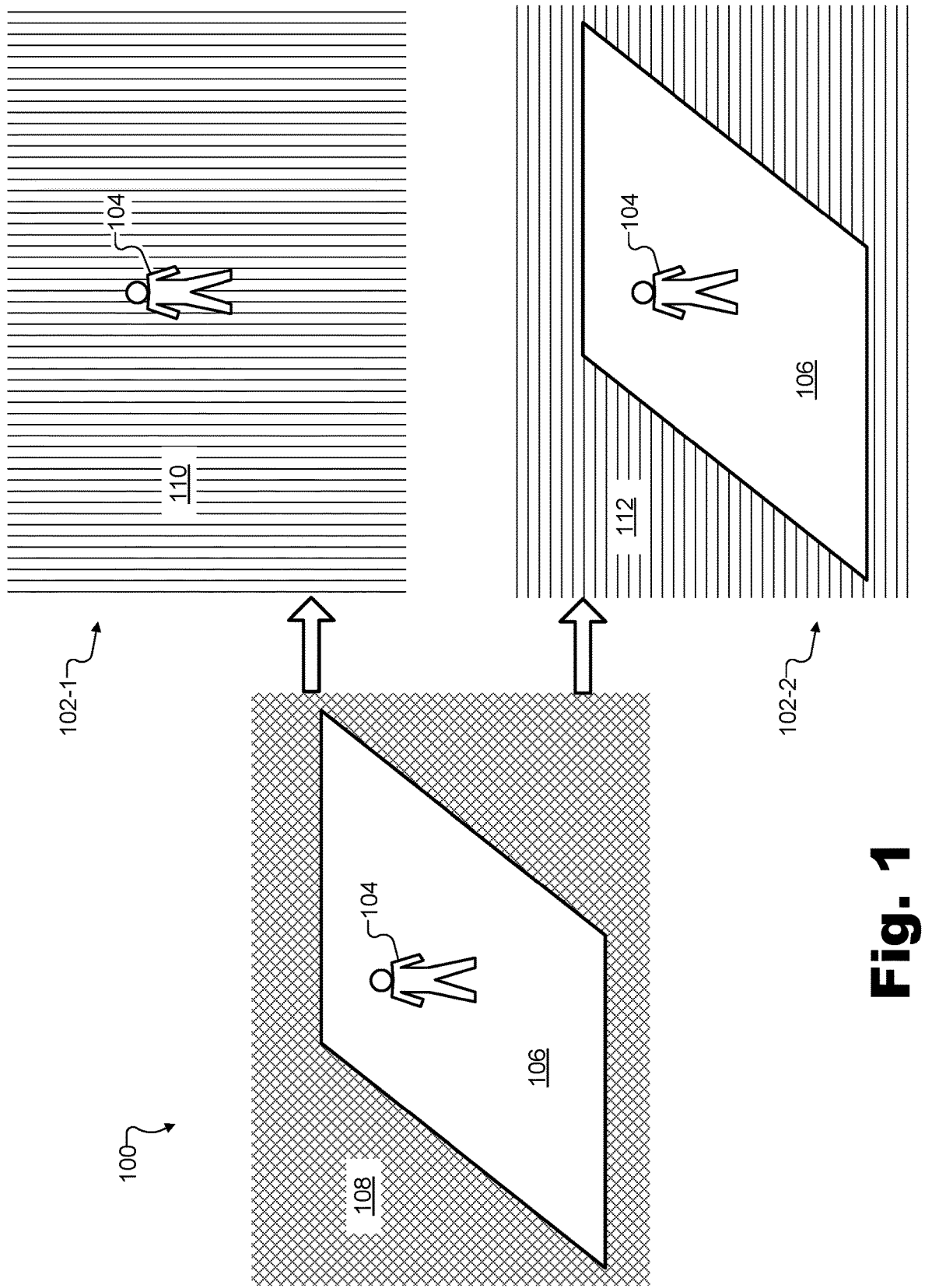
FIG. 1 illustrates exemplary three-dimensional ("3D") content that can be generated based on a real-world scene and a real-world object present at the real-world scene according to embodiments described herein.

Methods and systems for generating three-dimensional ("3D") content based on one or more two-dimensional ("2D") video images are described herein. For instance, in some implementations, a type of 3D content generation system referred to herein as a volumetric modeling system may access a plurality of 2D video images that are captured from a specific set of vantage points around a real-world scene. Such images may be used to generate volumetric 3D content in real time. For instance, the set of vantage points may be arranged in a calibrated formation encircling the real-world scene and video capture devices disposed at each of the vantage points may be calibrated with extrinsic parameters that relate each vantage point of each video capture device to a world coordinate system associated with the real-world scene. Such examples may be highly flexible and may be capable of modeling, in 3D, any object that may happen to come onto the real-world scene based on the 2D video capture of the object. Such volumetric modeling examples may require significant processing, however, particularly if the volumetric modeling and scene recreation is to occur in real time. For example, when 2D video images are converted into voxels of a 3D model, the voxels may number in the billions, or even trillions. As a result, various techniques described herein may be employed such that 2D video images may be processed within a practical amount of time and with a reasonable amount of computing power.

Additionally, as will be further described herein, 3D content may be generated based on a 2D video image without volumetrically modeling real-world objects from a real-world scene in such a processing-heavy manner. For example, in scenarios where the real-world scene is known to a system or analyzable ahead of time, and where it is possible to anticipate which objects will be present in the real-world scene ahead of time such that 3D models for each object can be prepared, a 3D simulation that requires significantly less computing power than the volumetric processing described above may provide several of the same benefits, along with additional benefits.

For instance, an exemplary type of 3D content generation system referred to herein as a 3D simulation system may access a 2D video image. The 2D video image may be captured by a video capture device and may depict a bounded real-world scene and one or more real-world objects present within the bounded real-world scene. The 3D simulation system may also access a 3D model of the bounded real-world scene and one or more 3D models of the real-world objects present within the bounded real-world scene. Based on the 2D video image, the 3D simulation system may track one or more spatial characteristics of the real-world objects relative to the bounded real-world scene. Then, based on the tracked spatial characteristics, as well as based on the 3D models of the bounded real-world scene and the real-world objects, the 3D simulation system may generate a 3D simulation of the bounded real-world scene within which the real-world object is simulated in accordance with the tracked spatial characteristic of the real-world object.

A 3D simulation generated in this way may not represent the real-world scene and the objects present therein with the same type of flexibility and precision as may be possible by other types of 3D content generations systems such as volumetric modeling systems described herein that are configured to perform 3D volumetric modeling. For example, the 3D simulation may require that 3D models be predefined and accessible for each of the objects in the scene and may be less equipped to simulate unknown objects that enter the scene without being anticipated ahead of time. For many scenarios, however, certain assumptions relied on by the 3D simulation system described above (e.g., that predefined 3D models are available for the bounded real-world scene and for each object present therein, etc.) may be perfectly valid assumptions, thereby allowing these methods to provide 3D content using far fewer computing and processing resources than used by a volumetric modeling system, based on only a single 2D video image rather than a plurality of such images, based on 2D video capture devices that are not specifically calibrated and positioned in accordance with certain characteristics required for the volumetric modeling, and so forth.

One exemplary scenario served well by such a 3D simulation system is a live televised event for which it is desirable to provide viewers not only with the 2D television feed but also with 3D content viewable by way of augmented reality media player devices used by the viewers (e.g., augmented reality media player devices worn by the viewers). For instance, a live sporting event such as a tennis match, a live musical event such as a rock concert, and/or various other types of live televised events may be viewed by a user using an augmented reality media player device that is associated with a 3D simulation system such as described above. In this example, the 3D simulation system may receive a televised 2D video image that is captured by a television camera and that depicts both 1) a bounded real-world scene within which a televised real-world event (e.g., a live tennis match, etc.) is occurring, and 2) a person (e.g., a tennis player competing in the match, etc.) who is associated with the televised real-world event and present within the bounded real-world scene.

The 3D simulation system may access a 3D model of the bounded real-world scene (e.g., a 3D model of the tennis court) and a 3D model of the person associated with the televised real-world event (e.g., a 3D model of the specific player). In some examples, the 3D simulation system may further access additional 3D models (e.g., of a competing player, of the tennis racquets used by the players, of the ball, of the net, of ball retrievers who run onto the court periodically, etc.) as may serve a particular implementation. Based on the 2D video image, the 3D simulation system may track a spatial characteristic of the person relative to the bounded real-world scene. For instance, the 3D simulation system may track a pose of the person that includes a combination of a spatial orientation of the person (e.g., which direction the player is facing, how the player's arms and legs are positioned, etc.) and a spatial location of the person (e.g., where on the tennis court the player is located, whether the player is in the air after having jumped, etc.). The 3D simulation system may then present a 3D simulation as an augmentation that is viewable by way of an augmented reality media player device used by a user (e.g., a viewer tuning in to watch the televised event). For example, the 3D simulation may depict the bounded real-world scene and the person on the scene. The 3D simulation may be generated based on the tracked pose of the person and the 3D models of the bounded real-world scene, such that the person may be simulated in accordance with the tracked pose so as to mirror the actual person in the actual real-world scene. This augmentation may be configured so as to be presented in a vicinity of a display screen that is presenting the televised real-world event. For example, if the televised real-world event is being viewed on a television screen, the augmentation including the 3D representation may be presented next to the television screen or at another suitable location in the vicinity of the screen (e.g., at a part of the room that is clear of furniture such that a simulation of the real-world scene may be presented there).

Various benefits may arise from each of the different methods and systems for generating 3D content based on 2D video images described herein. For example, as mentioned above, methods and systems described herein for performing volumetric modeling based on 2D video images captured from predefined vantage points around a real-world scene may improve on conventional methods and systems by being more reliable, providing higher quality 3D models, and being more efficient so as to require fewer processing resources than conventional techniques.

Similarly, methods and systems described herein for performing 3D simulation based on 2D video images and predefined models may provide benefits corresponding to more flexibility regarding video capture device placement for capture of the 2D video image, and may be performed in real time without demanding the same high level of computing power as volumetric techniques. For example, 3D simulation described herein may be performed based on a 2D video image captured by a single video capture device such as a single television camera, a user device (e.g., a camera of a cell phone or other mobile device), or any other suitable video capture device, rather than needing to be performed based on multiple specially configured cameras arranged in a calibrated configuration. Moreover, while volumetric modeling techniques generally require both color and depth information about objects being modeled, 3D simulation may be performed based on the color information alone without depth data being required.

Various embodiments will now be described in more detail with reference to the figures. The disclosed methods and devices may provide one or more of the benefits mentioned above and/or various additional and/or alternative benefits that will be made apparent herein.

FIG. 1 illustrates exemplary 3D content that may be generated based on a real-world scene and a real-world object present at the real-world scene. As used herein, objects located proximate a real-world scene may be referred to as being "at" the scene, "in" or "within" the scene, "on" the scene, and so forth. It will be understood that such objects are located at points in space that are closely associated with the scene (e.g., encompassed by the scene, nearby the scene, etc.) regardless of which terminology is employed.

In FIG. 1, representation 100 depicts aspects of a bounded real-world scene and a real-world object as the scene and object exist in reality, while the respective representations 102 (i.e., representations 102-1 and 102-2) depict aspects of how the scene and the object of representation 100 may be represented as 3D content such as a volumetric model or a 3D simulation. As shown in representation 100, an object 104 is included within a real-world scene 106 that has specific boundaries separating it from a background 108. Each of these components of representation 100 will now be described in more detail.

Object 104 is depicted in FIG. 1 as a person standing in the middle of real-world scene 106 and will therefore also be referred to herein as person 104. It will be understood, however, that a person such as person 104 is only one of many types of objects that could be included within a particular real-world scene 106. For instance, in addition to or instead of person 104, real-world objects such as inanimate objects, animals, and so forth may be present within real-world scene 106. Generally, the types of real-world objects present within a real-world scene depend on the nature of the real-world scene and what is happening within it. For example, if real-world scene 106 is a tennis court where a tennis match is happening, real-world objects such as players, tennis racquets, a tennis ball, a net, and so forth may be included within the scene. In contrast, if real-world scene 106 is a stage where a musical concert is being performed, real-world objects such as musicians, instruments, microphones, amplifiers, smoke, spotlights, and so forth may be included within the scene.

2D video images capturing real-world scene 106 may depict real-world object 104 and/or other real-world objects as may be present within real-world scene 106. In some examples, for instance, a 2D video image may be captured by a video capture device to depict a plurality of real-world objects each of which is present within real-world scene 106 and one of which is real-world object 104. This plurality of real-world objects may include, for example, a person (e.g., person 104) and an inanimate object that is used by the person (e.g., a tennis ball hit by person 104 if person 104 is a tennis player competing in a tennis match).

Real-world scene 106 is shown to have specific boundaries demarcating where real-world scene 106 ends and background 108 begins. While such specific bounding may not be necessary or useful for certain implementations (as will be described below), in other examples, the boundaries of real-world scene 106 may be relevant and an important part of generating 3D content representative of real-world scene 106 and any real-world objects (including person 104) included therein. To this end, real-world scene 106 may be referred to as bounded real-world scene 106, and it will be understood that, real-world scene 106 may be identified and modeled in any suitable manner. For example, a 3D simulation system may identify (e.g., prior to accessing 3D models of real-world objects for generation of a 3D simulation) a fixed space within which a real-world event is confined. For instance, in the example where the real-world event is a tennis match, this fixed space may be the tennis court. Based on the identified fixed space, the 3D simulation system may define a boundary of a bounded real-world scene. In the tennis example, for instance, the 3D simulation system may define the specific lines demarcating the boundaries between bounded real-world scene 106 and space and objects that are to be considered part of background 108 by detecting the edges of the tennis court and defining the space within those edges as bounded real-world scene 106, and by defining everything outside of that space (e.g., the sidelines, stands where spectators are sitting, etc.) as background 108. Based on this defined boundary, the 3D simulation system may generate the 3D model of bounded real-world scene 106 (e.g., the tennis court in this specific example).

A bounded real-world scene may be closely integrated with the objects included therein for certain examples, and, as such, these concepts may blend together to some extent such that a 3D model of a real-world scene may be implemented as a combination of all the 3D models of all of the real-world objects present within a defined area or volume. In other examples, there may be a significant difference between a scene and the objects at the scene. For example, bounded real-world scene 106 may encompass permanent and unmoving aspects of the tennis court in the tennis example, including the lines painted on the court, the poles posted to support the net, and so forth. In this example, real-world objects (including real-world object 104) may include players, racquets, balls, the net, and any other objects that are likely to move with respect to the court. (The net may be generally stationary, but may flex or move slightly in certain instances such as when the ball is hit into the net.)

While a tennis court has been described and will continue to be used as a convenient example in the description herein, it will be understood that bounded real-world scene 106 may represent any real-world area or region that may be captured by a set of video capture devices. For example, bounded real-world scene 106 may incorporate any type of area including a relatively small area (e.g., a single room or smaller) or a relatively large area (e.g., a playing field of a professional sports stadium or larger). Bounded real-world scene 106 may take any shape or form (e.g., the rectangular shape shown in FIG. 1, a circular or elliptical shape, an irregular shape, etc.), including a single continuous area or a collection of unconnected areas. Additionally, bounded real-world scene 106 may be associated with an event that is ongoing (e.g., a sporting event, a musical concert, or another type of event such as a festival or party, a live political debate, or the like) in any indoor area, outdoor area, or combination area that includes indoor and outdoor regions.

In other examples, bounded real-world scene 106 may not be associated with an event at all, but may be associated with something else that needs to be modeled or simulated (e.g., a virtual reality conference call, a virtual reality television program or movie, etc.) for any reason as may serve a particular implementation. In some of these examples, the boundaries of real-world scene 106 may not need to be defined, whereas in other example, they may be defined in any manner as may serve a particular implementation (e.g., the walls of a room, the edges of a stage, an arbitrary shape drawn around an on-scene news reporter and the subject that he or she is reporting on, etc.).

Background 108 may include any real-world space and/or real-world objects that are outside of the boundaries of bounded real-world scene 106. For instance, as mentioned above, background 108 may include the sidelines and spectator areas that are captured by video capture devices recording a tennis match, or any other area external to a bounded real-world scene in a particular example. Is some examples, the line between bounded real-world scene 106 and background 108 may be relatively arbitrary (e.g., the boundary may not correspond with any real-world boundary such as the edges of the tennis court), but may be specifically defined nonetheless for reasons that will become apparent in the description below.

Representation 102-1 shows a volumetric model or a simulation of person 104 against a background 110. In this example, the 3D model of person 104 has been generated so as to be separate from real-world scene 106. As such the 3D model may be presented as an augmentation or within a virtual reality world independently from real-world scene 106.

In contrast, representation 102-2 shows the volumetric model or 3D simulation of person 104 together with a 3D model of real-world scene 106 so that the relationship between bounded real-world scene 106 and the real-world objects included therein (including person 104) is maintained. It is noted, however, that the combination of bounded real-world scene 106 and person 104 is depicted over a background 112, which is a different background than the actual background 108 present where real-world scene 106 is being recorded. In this way, as will be described in more detail below, a full real-world scene and various real-world objects present at the scene may be captured and simulated in various situations where 3D content is used. For example, the scene may be presented as an augmentation in an augmented reality or mixed reality experience so that a user can, for example, watch a tennis match on television and simultaneously see a 3D simulation of the bounded tennis court and players participating in the match on a tabletop near the television.

Figure 2:
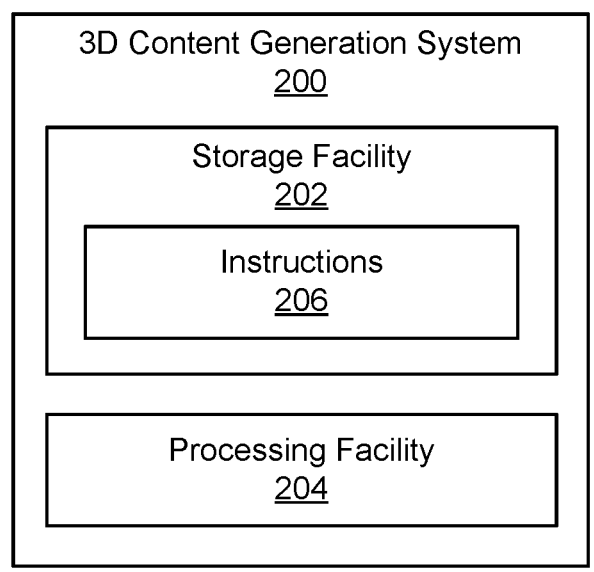
FIG. 2 illustrates an exemplary 3D content generation system for generating 3D content based on one or more 2D video images according to embodiments described herein.

FIG. 2 illustrates an exemplary 3D content generation system 200 ("system 200") for generating 3D content in the ways described herein. For example, as will be described in more detail below, certain implementations of system 200 may be volumetric modeling systems configured to generate volumetric models of real-world objects to be presented on their own (e.g., such as in representation 102-1) or together with a real-world scene (e.g., such as in representation 102-2). Other implementations of system 200 may be 3D simulation systems configured to generate 3D simulations of the real-world object within the environment of the real-world scene. In either case, the 3D content may be generated based on one or more 2D video images captured of the real-world scene and objects associated therewith.

As shown, system 200 may include, without limitation, a storage facility 202 and a processing facility 204 selectively and communicatively coupled to one another. Facilities 202 and 204 may each include or be implemented by hardware and/or software components (e.g., processors, memories, communication interfaces, instructions stored in memory for execution by the processors, etc.). In some examples, facilities 202 and 204 may be distributed between multiple computing devices or systems (e.g., multiple servers, etc.) and/or between multiple locations as may serve a particular implementation. Each of facilities 202 and 204 within system 200 will now be described in more detail.

Storage facility 202 may store and/or otherwise maintain executable data used by processing facility 204 to perform any of the functionality described herein. For example, storage facility 202 may store instructions 206 that may be executed by processing facility 204. Instructions 206 may be executed by processing facility 204 to perform any of the functionality described herein, and may be implemented by any suitable application, software, code, and/or other executable data instance. Additionally, storage facility 202 may also maintain any other data accessed, managed, generated, used, and/or transmitted by processing facility 204 in a particular implementation.

Processing facility 204 may be configured to perform (e.g., execute instructions 206 stored in storage facility 202 to perform) various functions associated with generating 3D content based on 2D video images. For example, if system 200 is implemented as a volumetric modeling system, processing facility 204 may be configured to access a plurality of 2D video images captured by a set of video capture devices disposed in a calibrated formation to capture imagery representative of one or more objects (e.g., objects included within a bounded real-world scene in certain examples). For example, the plurality of 2D video images may depict, using color data (e.g., displayable image data such as RGB data, grayscale data, etc.), a real-world object that is to be modeled. Together with the color data for the 2D video images, processing facility 204 may also access depth data representative of the same objects (e.g., depth data corresponding to the color data of the 2D video images).

Based on the 2D video images and the depth data, processing facility 204 may identify a particular object depicted by the 2D video images, and generate a volumetric 3D model for the particular object. For instance, processing facility 204 may form a point cloud for the object based on the depth data, perform voxelization operations to represent the object as a 3D object, convert the voxels into an object mesh, decimate the mesh to simplify and reduce the amount of data needed to represent the mesh, texturize the decimated mesh to complete the 3D model of the particular object, and/or otherwise perform any of the operations described herein for generating a 3D model using volumetric modeling techniques.

If system 200 is implemented as a 3D simulation system, processing facility 204 may similarly be configured to access a 2D video image that is captured by a video capture device and that depicts a bounded real-world scene and a real-world object present within the bounded real-world scene. In this example, however, it may not be necessary that the video capture device is included within a set of video capture devices disposed in a calibrated formation, or that the capture device be disposed at any particular location as long as the vantage point of the video capture device is such that the 2D video image depicts the real-world object. This is because, rather than volumetrically generating a 3D model of the real-world object, a 3D simulation system may be configured to rely on 3D models that have been previously defined. Accordingly, processing facility 204 may access a predefined 3D model of the bounded real-world scene and a 3D model of the real-world object.

Based on the 2D video image that has been accessed, processing facility 204 may track a spatial characteristic of the real-world object relative to the bounded real-world scene. For example, computer vision techniques (including those that leverage machine learning, artificial intelligence, and so forth) may be used to track the motion of the real-world object, the position of the real-world object, the orientation of the real-world object, or any combination thereof (e.g., the pose of the real-world object). Based on the spatial characteristic that has been tracked and the 3D models of the bounded real-world scene and the real-world object that have been accessed, processing facility 204 may generate a 3D simulation of the bounded real-world scene within which the real-world object is simulated in accordance with the tracked spatial characteristic of the real-world object. The result is a simulation that may appear similar or identical to the volumetric model generated by the volumetric modeling system implementation of system 200, but that may operate more efficiently at the cost of flexibility in what can be represented.

In some examples, system 200 may be configured to operate in real time so as to provide, receive, process, and/or use the data described above (e.g., 2D video images, etc.) immediately as the data is generated, updated, changed, or otherwise becomes available. As a result, system 200 may generate and provide 3D content based on 2D video images as the images are recorded or received, thereby allowing the 3D content to immediately reflect what is being represented by the 2D content as occurring within the real-world scene. For example, if the captured 2D video images are used to generate augmentations presented as part of an extended reality experience (e.g., an augmented, virtual, or mixed reality experience), system 200 may operate in real time so as to allow the extended reality user to virtually experience a real-world event as the event is taking place in the real world.

As used herein, operations may be performed in "real time" when they are performed immediately and without undue delay. In some examples, real-time data processing operations may be performed in relation to data that is highly dynamic and time sensitive (i.e., data that becomes irrelevant after a very short time). As such, real-time operations may generate 3D content (e.g., 3D volumetric models, 3D simulations, etc.) based on 2D video images based on captured data that is relevant and up-to-date.

Figure 3:
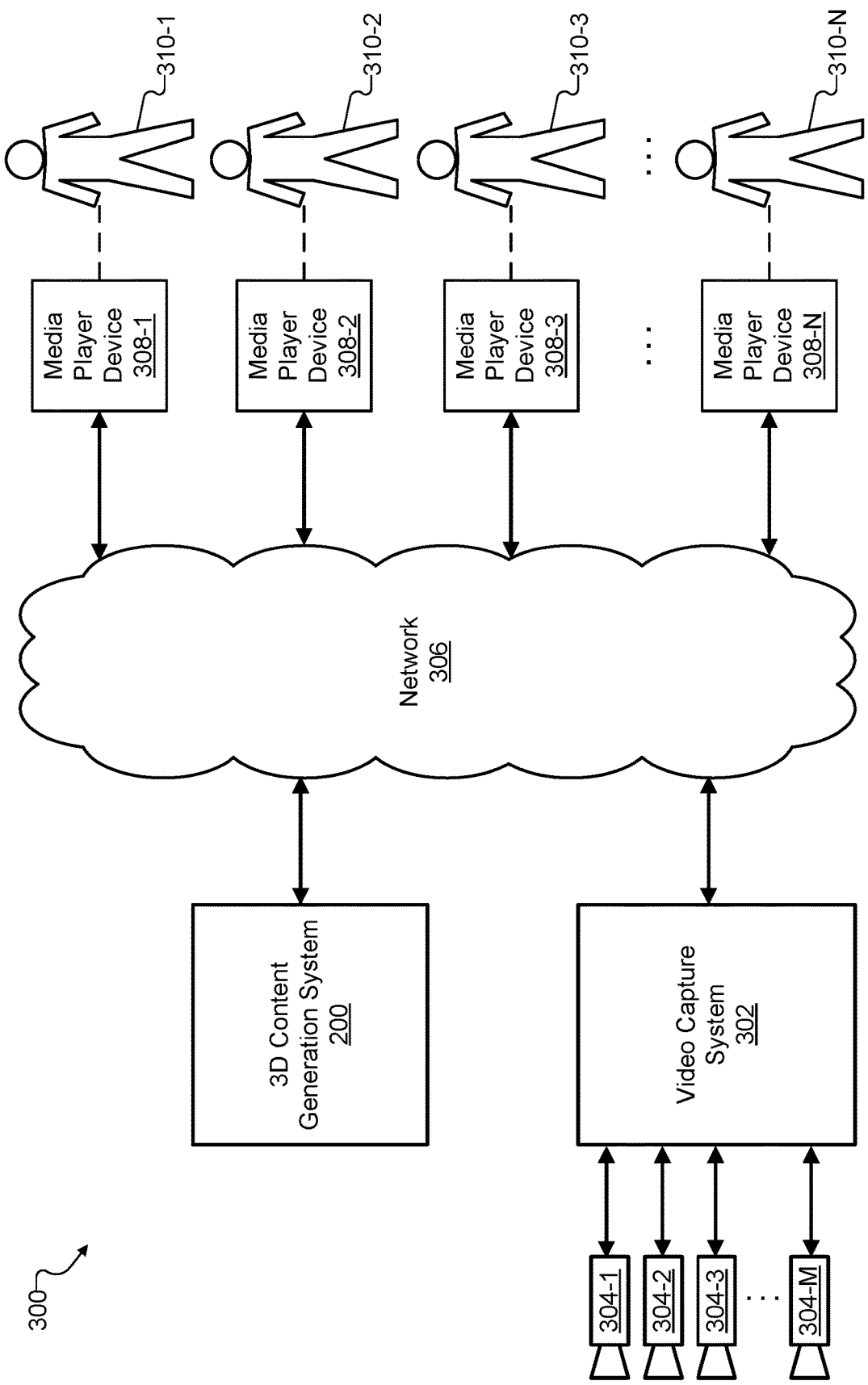
FIG. 3 illustrates an exemplary configuration within which an implementation of the 3D content generation system of FIG. 2 generates 3D content based on 2D video images according to embodiments described herein.

FIG. 3 illustrates an exemplary configuration 300 within which different implementations of system 200 may operate to generate 3D content based on 2D video images according to principles described herein. Specifically, as shown, configuration 300 includes system 200 and a video capture system 302 that is communicatively coupled to a plurality of video capture devices 304 (e.g., video capture devices 304-1 through 304-M) on a server-side of a network 306. System 200 and video capture system 302 are also communicatively coupled, by way of network 306 to a plurality of media player devices 308 (e.g., media player devices 308-1 through 308-N) that are on a client-side of network 306. Each of media player devices 308-1 through 308-N is also shown to be associated with a respective user 310 (e.g., users 310-1 through 310-N, respectively).

The systems and devices shown in configuration 300 are each implemented by computing systems comprising computer hardware and software such as will be described in more detail below. In some examples, some of the systems may include or be implemented by off-the-shelf server computers or portable devices that include general purpose processors (e.g., central processing units ("CPUs"), graphics processing units ("GPUs"), etc.). In the same or other examples, certain of the systems shown in configuration 300 may include or be implemented by more specialized hardware or software such as, for example, an application specific integrated circuit ("ASIC"), a field programmable gate array ("FPGA"), or other hardware configured specifically for the particular system or device being implemented. Custom software such as a 3D content application may be executed by processors on both the server side and the client side, may be implemented by the custom hardware (e.g., one or more ASICs, one or more FPGAs, etc.), or may be implemented using a combination of hardware and software.

While each of the components of configuration 300 will be described as self-contained functional units, it will be understood that certain functionality of the components shown in FIG. 3 may be performed by multiple components or by components other than those described. For example, while system 200 is shown as a server-side system (on the left side of network 306), it will be understood that the functionality of system 200 as described herein may be at least partially performed on the server side, on the client side (e.g., by one or more of media player devices 308), on network 306 (e.g., by a multi-access edge compute ("MEC") server implemented on a provider network incorporated into network 306, by a cloud server implemented on a part of network 306 other than the provider network, etc.), or at any other location as may serve a particular implementation. Each of the components of configuration 300 will now be described in more detail with reference to FIG. 3, as will as with reference to FIGS. 4-9.

Video capture system 302 may be communicatively coupled to video capture devices 304 so as to allow video capture system 302 to direct video capture devices 304 to capture imagery of a real-world scene and one or more real-world objects that are present therein. Video capture system 302 may also be communicatively coupled to system 200 to provide 2D video images captured by video capture devices 304 to system 200 for processing. In some examples, video capture system 302 may include a data repository to allow video capture system 302 to store captured 2D video images and to provide the images to system 200 on request. In other examples, video capture system 302 may provide the 2D video images to system 200 immediately as the images are captured (e.g., without temporary storage of the images), and system 200 may perform any storage (e.g., buffering, longer term storage, etc.) of the 2D video images using its own storage repository (e.g., storage facility 202). In certain implementations, video capture system 302 may access 2D video images from user devices such as media player devices 308, from a social networking application that is configured to generate user profiles for users 310 to thereby personalize the 3D content that is to be generated by system 200, or from any other suitable image source as may serve a particular implementation.

Video capture system 302, system 200, and video capture devices 304 may each be implemented in different ways based on the use case being implemented in a particular scenario. For example, if there is sufficient processing power and a need to represent 3D content in real time that is difficult to anticipate or for which 3D models are not available, system 200, video capture system 302 and video capture devices 304 may be implemented in a volumetric modeling system configuration.

Figure 4:
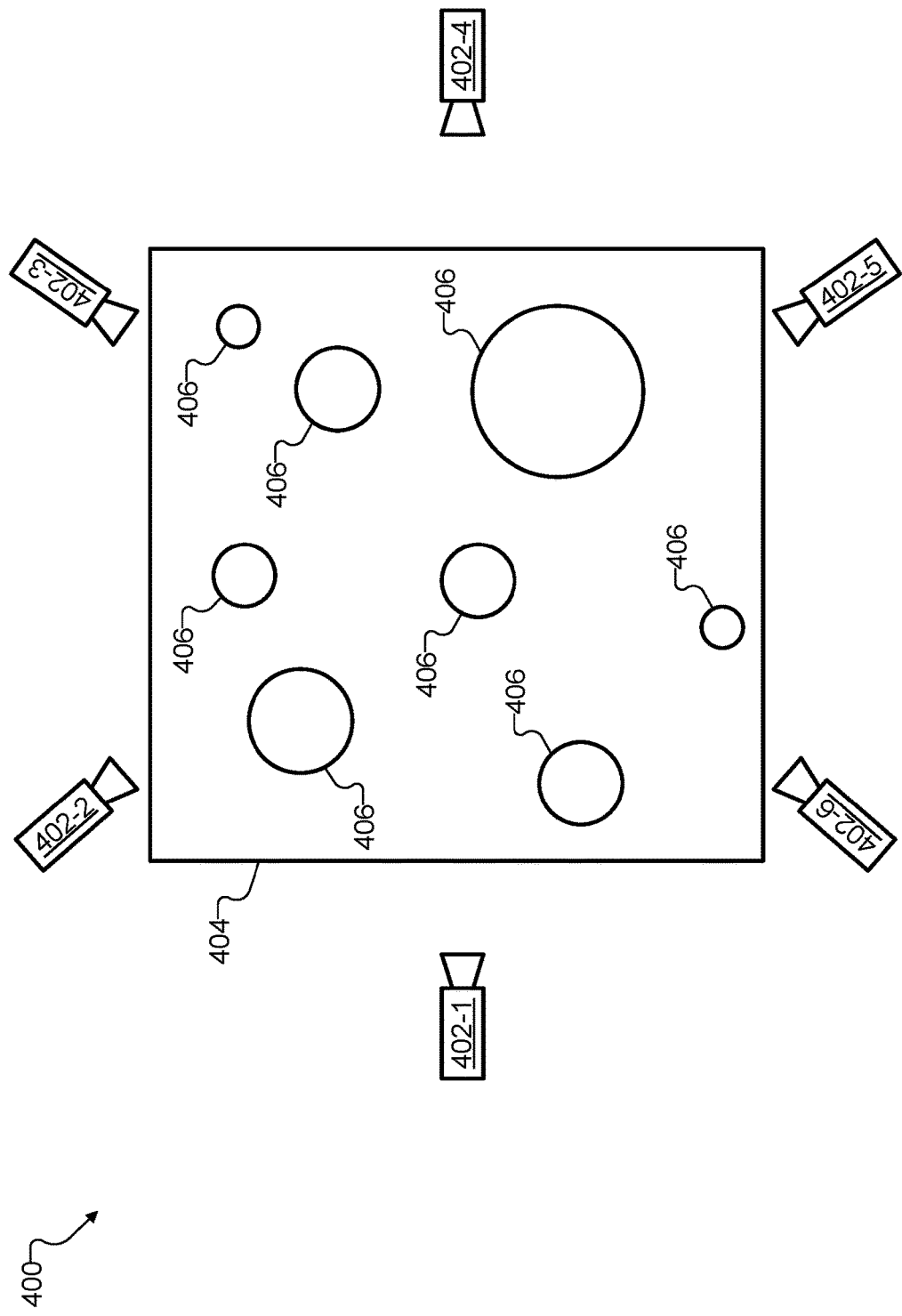
FIG. 4 illustrates an exemplary volumetric modeling system configuration for a set of video capture devices according to embodiments described herein.

To illustrate, FIG. 4 shows an exemplary volumetric modeling system configuration 400 for a set of video capture devices 402 (e.g., video capture devices 402-1 through 402-6) that are capturing imagery associated with a bounded real-world scene 404 that includes a plurality of real-world objects 406. As shown, each of video capture devices 402 is disposed at a different vantage point with respect to a bounded real-world scene 404. Each video capture device 402 may capture, from a respective vantage point with respect to bounded real-world scene 404, surface data such as color data (i.e., how surface points appear in either color or grayscale) and/or depth data (i.e., where surface points are located with respect to a vantage-point-specific coordinate system or world coordinate system). Additionally, each video capture device 402 may generate additional data (e.g., metadata indicative of the vantage point from which surface data is captured, etc.) to be provided to video capture system 302 together with the surface data.

Bounded real-world scene 404 may be implemented as any of the types of real-world scenes described herein. For example, bounded real-world scene 404 may be an implementation of bounded real-world scene 106, described above in relation to FIG. 1.

As shown, various real-world objects 406 ("objects 406") are included within bounded real-world scene 404. While, for sake of illustration, objects 406 are depicted as different sized circles, it will be understood that each object 406 may represent any type of object described herein. For example, object 406 may be implemented by object 104 or by another animate or inanimate object of any shape or size as may serve a particular implementation. If bounded real-world scene 404 includes a football stadium, objects 406 may represent the players on each team, the football, the goal posts, the referees, and so forth. As another example, if bounded real-world scene 404 includes a tennis court or a concert stage, objects 406 may represent any of the specific types of objects described above in relation to FIG. 1. As mentioned above, in certain examples, the plurality of real-world objects in a scene such as bounded real-world scene 404 may include both one or more people (such as person 104) and one or more inanimate objects that are used by the people.

In order for volumetric models to be generated based on imagery captured from video capture devices 402, each video capture device may be arranged in a calibrated formation such that each video capture device 402 is associated with known extrinsic parameters that define the relationship between the vantage point of the capture device and the vantage points of the other capture devices, the scene itself, and/or a particular coordinate system associated with one of the capture devices or with the scene (e.g., a local or world coordinate system). Each video capture device 402 may also be calibrated with intrinsic calibration parameters. The intrinsic and extrinsic calibration may be performed in any suitable manner. For example, a sample image having unique markers that are readily recognizable and/or distinguishable using computer vision techniques may be shown to each of video capture devices 402 and used for the calibration. In certain examples, a cube with ArUco markers may be used as a calibration pattern. In the same or other examples, an iterative point cloud ("ICP") may be used for refined calibration.

Along with capturing color data representative of how light reflects off each surface point of objects 406 to be captured at the respective vantage points of video capture devices 402, it may also be desirable to capture depth data representative of where each surface point is located in space. To this end, each video capture device 402 may be associated with or include a depth capture device configured to detect the depth data from the same vantage point as the video capture device (or a vantage point very near to the same vantage point). For instance, the depth capture devices may include time-of-flight sensors, lidar sensors, passive infrared sensors, or other suitable devices used for 3D depth scanning (e.g., INTEL REALSENSE depth cameras, etc.). In other examples, the combination of video capture devices 402 may be used to determine depth data using stereoscopic depth detection techniques.

Based on the color and depth data captured from each of the vantage points of video capture devices 402, system 200 may generate volumetric models of each object 406. In some examples, the 3D model may be generated separate from the other objects and from bounded real-world scene 404 such that the resultant 3D model of the object 406 may be presented in front of any arbitrary background (e.g., such as background 110 illustrated in representation 100-1 of FIG. 1). In other examples, the 3D model of a particular object 406 may be generated together with 3D models of the other objects 406 and/or with a 3D model of bounded real-world scene 404. In these examples, a 3D model of the entire scene (including the objects) may be presented in front of a background (e.g., such as background 112 illustrated in representation 100-2 in FIG. 1).

Figure 5:
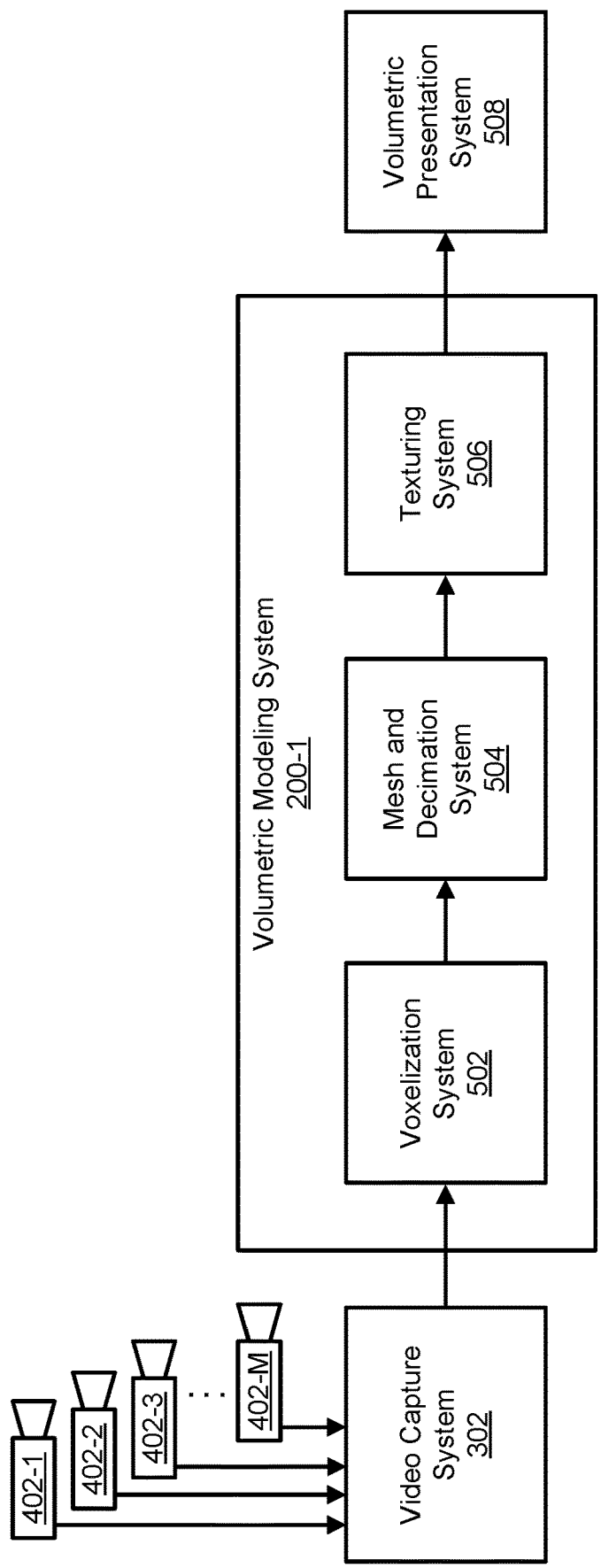
FIG. 5 illustrates an exemplary volumetric modeling system implementation of the 3D content generation system of FIG. 2 according to embodiments described herein.

To illustrate this volumetric modeling in more detail, FIG. 5 shows an exemplary volumetric modeling system implementation 200-1 of system 200. As mentioned above, a volumetric modeling system is one type of 3D content generation system that is described herein, and implementation 200-1 will thus be understood to be one exemplary implementation of a certain type of 3D content generation system 200. Consequently, implementation 200-1 of system 200 will also be referred to herein as volumetric modeling system 200-1.

As shown, volumetric modeling system 200-1 receives 2D video image content from video capture system 302, which, as described above, may receive captured video images from video capture devices 402. Upon receiving the 2D video images from video capture system 302, volumetric modeling system 200-1 is configured to process the 2D video images using a pipeline of subsystems each configured to perform a different function to thereby generate volumetric 3D content such as real-time 3D models of objects present at a real-world scene and/or a 3D model of the real-world scene itself. As shown in FIG. 5, such subsystems may include, for example, a voxelization system 502, a mesh and decimation system 504, and a texturing system 506. In certain examples, different or additional subsystems other than those illustrated in volumetric modeling system 200-1 may be employed as may serve a particular implementation.

After generating one or more volumetric models based on the 2D content provided by video capture system 302, volumetric modeling system 200-1 may provide data representative of the volumetric models to a volumetric presentation system 508. Volumetric presentation system 508 may be implemented by or otherwise associated with a media player device such as one of media player devices 308 described above, and may be communicatively coupled with the media player device 308 by way of a network such as network 306 in certain examples. Network 306 and media player devices 308 will be described in more detail below, but it will be understood that volumetric presentation system 508 may represent any suitable hardware and/or software that uses graphics display technology (e.g., 3D display technology, extended reality display technology, etc.) to present a representation of volumetric models received from volumetric modeling system 200-1.

Each of the subsystems 502, 504, and 506 of volumetric modeling system 200-1 will now be described in more detail.

Voxelization system 502 may receive 2D video image content from video capture system. As mentioned above, along with receiving color data, voxelization system 502 may further receive depth data representative of the same subject matter as the color video data. Voxelization system 502 may correlate surface points detected for various real-world objects and/or the real-world scene depicted in the 2D video images to generate a point cloud for each real-world object. In some examples, voxelization system 502 may create a point cloud from the 2D images that corresponds to each video capture device 402.

Based on the point clouds, voxelization system may perform voxelization techniques to convert the point clouds into voxelized data that may be further processed in the pipeline. For instance, in certain examples, voxelization system 502 may use a truncated distance function to create the voxels from the 2D video images received from each video capture device 402. As used herein, it will be understood that a voxel in a 3D space is analogous to a pixel in a 2D space. As a result, each voxel created by voxelization system 502 may be associated with 3D coordinates, and may take the form of a cube.

As shown in FIG. 5, mesh and decimation system 504 comes next in the pipeline, and may be configured to convert voxels created by voxelization system 502 into a mesh. As used herein, a mesh of a particular real-world object may refer to an untextured 3D model of the real-world object that is generated by combining the voxels that are derived from 2D video images from each of the video capture devices 402. For example, a mesh may be thought of as a wireframe model onto which color and texture has not yet been added.

The mesh generated by mesh and decimation system 504 may be composed of a large number of triangles connected together and assigned to particular coordinates in space. For example, mesh and decimation system 504 may convert approximately 10 million voxels into approximately 500,000 triangles in one particular example. Each of the triangles of the resultant mesh generated by mesh and decimation system 504 may include a direction vector (e.g., a vector representative of the normal of the triangle) that may be used to allow the triangles to be properly illuminated. Each triangle in the mesh may also be associated with particular texture coordinates indicative of a particular part of a texture map that is to be applied to that specific triangle to so cause the 3D model to look realistic. In some examples, mesh and decimation system 504 may determine the textures of the mesh by comparing a particular voxel to neighboring voxels. For instance, a marching cubes algorithm may be used to facilitate this process.

Along with generating the mesh, mesh and decimation system 504 may also perform decimation of the mesh to simplify the mesh and reduce the number of triangles that must be stored and processed for the 3D volumetric model. In one example, for instance, the decimation performed by mesh and decimation system 504 may reduce 500,000 triangles initially generated for the mesh into 50,000 triangles to allow the model to be more easily rendered, stored, and otherwise processed later in the pipeline or by volumetric presentation system 508. By performing this decimation of the mesh, mesh and decimation system 504 may be configured to preserve sufficient detail that the 3D model may be generated and updated in substantially real-time using available computing resources with reasonable power requirements. In some embodiments, a decimation algorithm is used that performs greater reduction of the triangles in areas that are not as important (e.g., clothing of a person being modeled) as compared to other, more important areas where more detail is needed (e.g., a face of the person being modeled).

By generating and updating a volumetric 3D model in real time using these mesh and decimation methods, volumetric modeling system 200-1 may provide a volumetric model that is animated to move in real time to mirror the real-world object being modeled. To this end, in certain implementations, volumetric modeling system 200-1 may perform 4D fusion of the mesh to adjust the 3D model as a function of time. For example, mesh and decimation system 504 may create a skeleton of a real-world object being modeled and being represented by a particular mesh. An abstraction of the shape of the object is created so as to estimate the motion as it occurs, and key points in a frame are identified and warped onto subsequent frames to match the estimate of the motion. Accordingly, the motion of the object may be averaged and noise from the mesh may be removed. In certain examples, mesh and decimation system 504 may determine an error value for each frame and, if the error value exceeds a threshold value, may generate new key points for the frame. Mesh and decimation system 504 may then compress the decimated mesh into a bit stream (e.g., a 20 mbps bit stream or any other suitable data rate) that is sent down the pipeline to texturing system 506.

Upon receiving the bit stream representative of the decimated mesh, texturing system 506 may uncompress the decimated mesh if necessary, and may then perform various texturing operations to add color and texture to the mesh to thereby complete the volumetric model. For example, texturing system 506 may perform texture packing of the compressed mesh that may be a similar process to the decimation in that more textures are preserved in certain areas of the 3D model than others. For example, more texture may be preserved for the face of a person than for the clothing of the person. By applying textures from a texture map as indicated by coordinates associated with each triangle in the mesh, shapes, colors, and textures may be added to the volumetric model to make the model recognizable as the real-world object that it represents. For this reason, more precise shape and color and texture data may be preserved for important areas such as the face than for less important areas such as the clothing. In some examples, together with adding texture to the volumetric model, audio may also be associated with the volumetric model at this stage. For instance, if the real-world object being modeled is a person who is talking, an audio recording of what the person is saying may be synchronized to the model so that the model may appear to be speaking in a manner that mirrors the real-world person being modeled.

Figure 6:
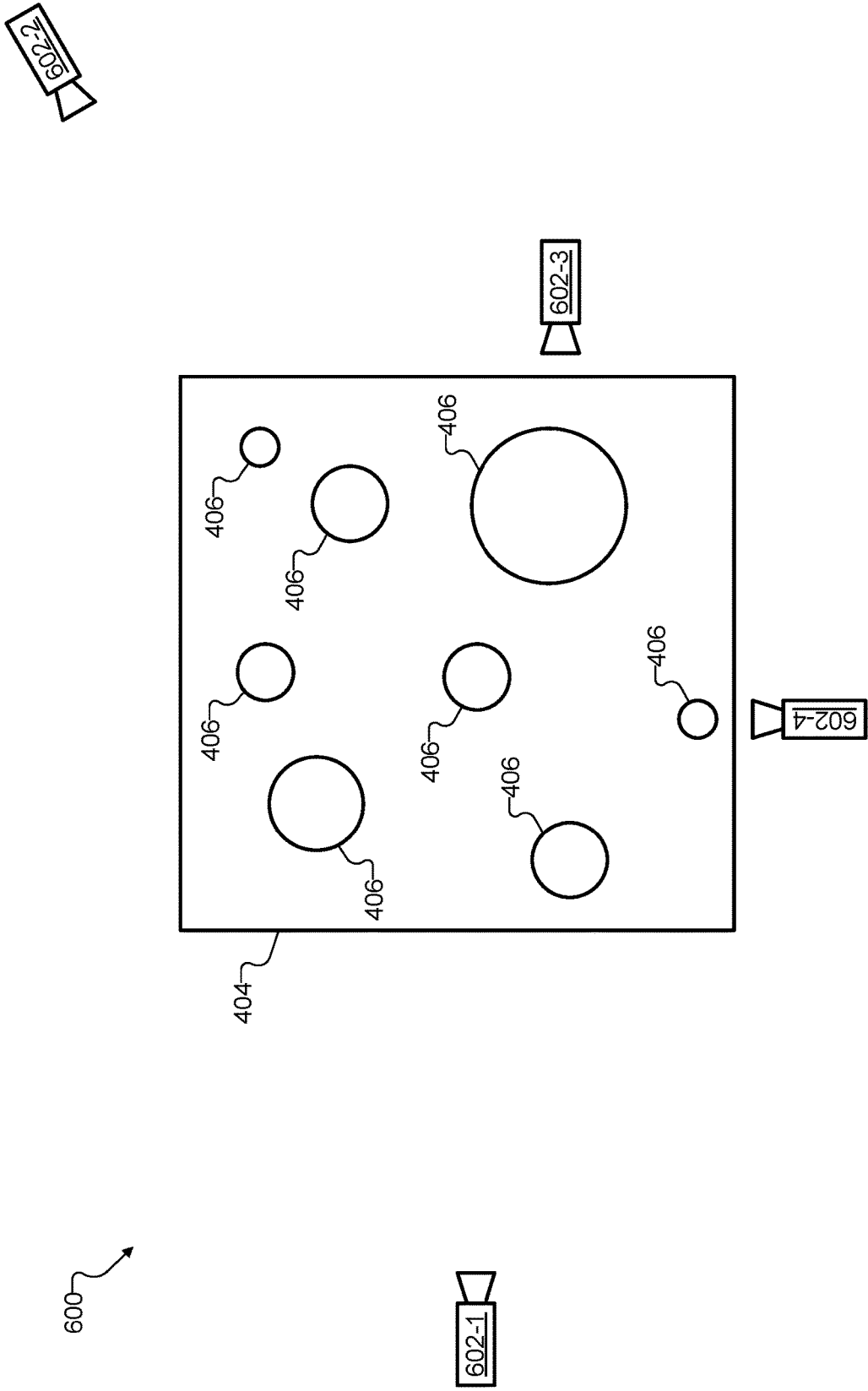
FIG. 6 illustrates an exemplary 3D simulation system configuration for a set of video capture devices according to embodiments described herein.
Figure 7:
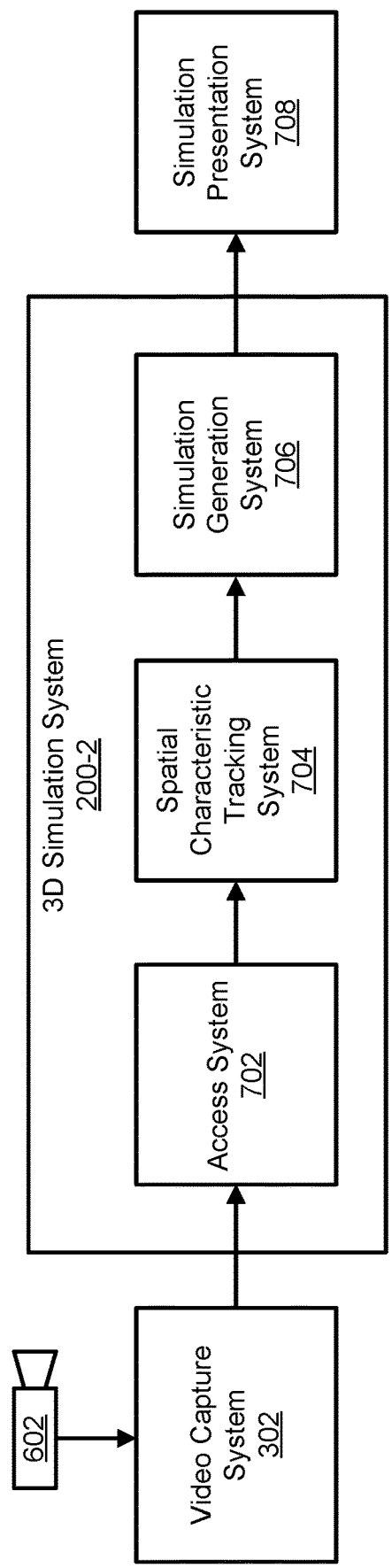
FIG. 7 illustrates an exemplary 3D simulation system implementation of the 3D content generation system of FIG. 2 according to embodiments described herein.

As mentioned above, a volumetric modeling system such as volumetric modeling system 200-1 is only one type of implementation of system 200 that may be used for certain types of situations and applications in configuration 300 of FIG. 3. In other scenarios and/or for other applications, a different type of implementation system 200 referred to herein as a 3D simulation system implementation may be used instead. FIGS. 6 and 7 illustrate such an implementation.

Specifically, FIG. 6 shows an exemplary 3D simulation system configuration 600 for a set of video capture devices capturing imagery associated with bounded real-world scene 404 and the plurality of real-world objects 406. In FIG. 6, bounded real-world scene 404 and real-world objects 406 are shown to be the same as described above in relation to FIG. 4. However, in place of video capture devices 402 of FIG. 4, FIG. 6 shows a plurality of video capture devices 602 (e.g., video capture devices 602-1 through 602-4) that are disposed at different vantage points with respect to bounded real-world scene 404. As with video capture devices 402, each video capture device 602 may capture, from a respective vantage point with respect to bounded real-world scene 404, color data representing how surface points appear (e.g., in color, grayscale, etc.), and, in some examples, may provide metadata describing the vantage point. However, it will be understood that, in spite of certain similarities between video capture devices 402 and 602, certain implementations of video capture devices 602 may be implemented as different types of video capture devices than may best serve a volumetric modeling system configuration such as configuration 400. For example, video capture devices 602 may be implemented by personal cameras (e.g., mobile phones, etc.) operated by spectators at an event, television cameras arranged and configured to capture an event for 2D televised broadcasting, or any other suitable video capture device, rather than video capture devices specifically configured for volumetric modeling.

This greater flexibility in video capture devices 602 arises in part because, in contrast to a volumetric modeling system configuration such as configuration 400, the 3D simulation system configuration of configuration 600 does not require video capture devices 602 to provide (or be associated with other capture devices configured to provide) depth data indicative of the respective depths of the surface points of bounded real-world scene 404 or objects 406. Moreover, as shown, while configuration 400 may require a precisely calibrated arrangement of vantage points for video capture devices 402, video capture devices 602 in configuration 600 may be arranged in a more flexible manner at arbitrary vantage points that are not associated with any particular calibrated formation. For example, as shown, certain video capture devices 602 may be placed near bounded real-world scene 404 while others are placed farther away, certain video capture devices 602 may be angled in a precise manner to capture objects in the scene or to capture the entire scene while others may be moved and reoriented in arbitrary ways (e.g., by people such as television camera operators, users of mobile devices, etc.), and so forth.

As a result of these differences between the capabilities and placement of video capture devices 602 as compared to video capture devices 402, the 2D video images provided to and processed by system 200 may be distinct from 2D video images described above in relation to the volumetric modeling system configuration 400. For example, 2D video images provided by video capture devices 602 may be represented by color data, but not necessarily depth data, for bounded real-world scene 402 and real-world object 406. As such, the tracking of spatial characteristics of objects 406 that will be described in more detail below may be performed based exclusively on a set of data that includes the color data representing the 2D video image and excludes any depth data representative of bounded real-world scene 404 or real-world objects 406.

Referring to the example in which bounded real-world scene 404 is implemented as a tennis court and objects 406 are implemented as players and inanimate objects associated with a tennis match, video capture devices 602 may be implemented as television cameras and may be placed and/or zoomed in so as to capture various fields of view of the tennis match. For example, one video capture device 602 may capture a long shot of the tennis match, other video capture devices 602 may capture dedicated close-ups of each player, another video capture device 602 may track and follow the ball as it moves back and forth on the tennis court, and so forth. Metadata associated with each video capture device 602 may include data indicative of a location of the capture device and/or where the capture device is pointing in space (e.g., the yaw, pitch, and position of the capture device).

To illustrate this 3D simulation in more detail, FIG. 7 shows an exemplary 3D simulation system implementation 200-2 of system 200. As mentioned above, a 3D simulation system is another type of 3D content generation system that is described herein, and implementation 200-2 will thus understood to be another exemplary implementation (along with implementation 200-1 described above) of a certain type of 3D content generation system 200. Consequently, implementation 200-2 of system 200 will be referred to herein as 3D simulation system 200-2.

As shown, 3D simulation system 200-2 receives 2D video image content from video capture system 302, which, as described above, may receive captured video images from one or more video capture devices 602. While several video capture devices 602 may be used in certain examples (as shown in FIG. 6), only a single video capture device 602 is shown in FIG. 7 because no more than a single video capture device may be required for 3D simulation system 200-2. Upon receiving the one or more 2D video images from video capture system 302, 3D simulation system 200-2 is configured to process the 2D video images using a pipeline of subsystems each configured to perform a different function to thereby simulate 3D content. As shown in FIG. 7, such subsystems may include, for example, an access system 702, a spatial characteristic tracking system 704, and a simulation generation system 706. In certain examples, different or additional subsystems other than those illustrated in 3D simulation system 200-2 may be employed as may serve a particular implementation.

After generating a 3D simulation based on the 2D video images provided by video capture system 302, 3D simulation system 200-2 may provide data required for presentation of the 3D simulation to a simulation presentation system 708. In some examples, simulation presentation system 708 may be implemented by or otherwise associated with a media player device such as one of media player devices 308 described above, and may be communicatively coupled with the media player device 308 by way of a network such as network 306. Network 306 and media player devices 308 will be described in more detail below, but it will be understood that simulation presentation system 708 may represent any suitable hardware and/or software that uses graphics display technology (e.g., 3D display technology, extended reality display technology, etc.) to perform 3D simulation based on data received from 3D simulation system 200-2.

For instance, in certain examples, simulation presentation system 708 may include a 3D graphics simulation engine (e.g., a video game engine, etc.). Such a simulator may receive input data indicative of what certain objects are (e.g., object classification data), how the objects move and/or are positioned and oriented in space (e.g., spatial characteristic data), and, based on this data, may render graphics that pose 3D models associated with the objects (e.g., models that appear identical or similar to the objects, models that act as avatars for the objects and look different from the objects, etc.) in corresponding ways. For example, the input data may indicate that the feet and arms of a character are swinging as the body of the character is moving forward in space, and the 3D graphics simulator may thus simulate a 3D model of the character to be walking forward. When the input data indicates that the character's body has jumped, the 3D graphics simulator simulates the jump, and so forth.

Because simulation presentation system 708 moves and reorients existing models based on input data from 3D simulation system 200-2 rather than regenerating the models for each frame (as may be performed by volumetric modeling system 200-1 described above), it will be understood that the quality level of the resultant 3D simulation may be as accurate as the 3D models that are used. In some examples, this may result in a simulation that is less accurate than volumetric modeling that may be performed by volumetric modeling system 200-1. For example, if a spectator were to run onto the tennis court during a match (or another such unexpected event were to occur), volumetric modeling may be able to capture the spectator as accurately as the players and ball are being captured, and the quality may be similar. In contrast, 3D simulation of such an occurrence may result in a lower quality simulation or may not be able to simulate the spectator at all since no 3D model may be readily available for the spectator (e.g., only objects such as the players, the ball, and other expected objects may be created in preparation for the game).

In other examples, however, this principle may allow 3D simulation to look even more accurate and graphically attractive than live-generated volumetric models. For example, while real-time volumetric modeling may only be able to capture the player's facial expressions, nuances of the players hair and clothes, etc., to a limited degree in the amount of processing time available, 3D simulation based on preexisting models may allow for very high definition, accurate 3D models to be used and reconfigured for each frame so that the simulation actually looks more accurate, or at least more graphically attractive (e.g., higher resolution, smoother movements, etc.) than the volumetric example. Accordingly, it is again reiterated that different types of implementations of system 200 may be most beneficial for serving different types of applications and use cases.

Each of the subsystems 702, 704, and 706 of 3D simulation system 200-2 will now be described in more detail.

Access system 702 may be configured not only to access 2D video images captured by video capture device 602 and provided by video capture system 302, but may further access data representative of any 3D models that may be used for the 3D simulation. For example, access system 702 may access a 3D model of bounded real-world scene 404 and a respective 3D model of each of objects 406.

Each 3D model accessed by access system 702 may include a representation of the scene or object that has been previously generated and that is represented in any format or data structure as may serve a particular implementation. Such 3D models may be generated in any suitable way and at any suitable time prior to or concurrently with being accessed by access system 702. For instance, in certain examples, the 3D models accessed by access system 702 may be volumetric models generated by an implementation of system 200 such as volumetric modeling system 200-1. Such 3D models may have been generated at a point much earlier in the past (e.g., prior to the day that the event being represented is to occur as part of the preparations to record and distribute the event) in certain examples, or, in other examples, may be generated immediately before the 3D simulation using the 3D models is generated.

An implementation of system 200 may be configured to implement both 3D simulation system 200-1 and 3D simulation system 200-2 such that one or more volumetric models may be generated at the beginning of a simulation and/or at various points during the simulation (e.g., to be used as keypoint frames or the like), and these volumetric models may be used as the 3D models presented by simulation presentation system 708 as the event proceeds. In this way, benefits of both volumetric modeling system 200-1 and 3D simulation system 200-2 may be achieved by essentially taking a hybrid approach in which models are generated volumetrically and then simulated and presented based on spatial characteristic tracking. More specifically, in such an example, access system 702 be coupled with an implementation of volumetric modeling system 200-1, which may access 2D video images captured by additional video capture devices 602 that are disposed at different vantage points in relation to bounded real-world scene 404 (e.g., vantage points in a calibrated formation such as illustrated in FIG. 4). Access system 702 may then access the 3D models of bounded real-world scene 404 and objects 406 from the implementation of volumetric modeling system 200-1 after it generates the 3D models based on color data and depth data from all of the 2D video images.

In other examples, the 3D models may be generated in other ways and/or by other systems separate from the implementation of system 200 being used to perform the 3D simulation. For instance, 3D models of scenes and objects may be generated prior to runtime using 3D scanners, computer-aided design ("CAD") tools, computer graphics generators, or any other 3D model generation tools or systems as may serve a particular implementation. In some examples, a user may be involved in generating the 3D models in accordance with the user's own preferences. Such 3D models may thus be generated prior to the accessing of the 2D video image by access system 702, and may be stored in a storage repository accessible to access system 702 (e.g., a 3D model databased included within system 200 or communicatively coupled with system 200, etc.).

Spatial characteristic tracking system 704 may receive 2D video image content depicting bounded real-world scene 404 and objects 406, and may be configured to track spatial characteristics of each object 406 relative to bounded real-world scene 404 based on the 2D video images. As used herein, a spatial characteristic may refer to any aspect of the spatial relationship between an object and a scene, including where the object is located in space relative to the scene, how the object is oriented in space relative to the scene (e.g., including orientation in the sense of which way the object is facing and orientation in the sense of how the object is contorted, bent, postured, or otherwise configured), and so forth. In some examples, the tracked spatial characteristic of a particular real-world object may be a pose of the real-world object, where the pose includes a combination of a spatial orientation of the real-world object and a spatial location of the real-world object. In certain of the same or other examples, the tracked spatial characteristic may represent detected movements, such that the pose of the object is not necessarily analyzed for each frame, but, rather, the changes in pose (i.e., the movements of the object) are analyzed from frame to frame, or from a particular keypoint frame to other associated frames. Determining such motion as part of the tracking may also be useful for predicting future movements of the object, as will be described in more detail below.

While tracking of objects based on 2D video images may often involve determining how spatial characteristics change from frame to frame in the video image, it will be understood that, as used herein, tracking may also be performed by analyzing a single frame of a video image to determine a pose or other spatial characteristic of a real-world object in that frame without regard for the spatial characteristic of the real-world object in any other frame. Additionally, in certain examples, spatial characteristic tracking system 704 may use keypoints for each image, simultaneous localization and mapping (SLAM), and/or other techniques to identify and detect the position of video capture device 602, how the video capture device is moving, how far away the video capture device is from the objects being tracked, and so forth. Various additional aspects of how spatial characteristic tracking system 704 may perform tracking and predicting operations will be described in more detail below.

Simulation generation system 706 may receive both the 3D models accessed by access system 702 and the tracking data generated by spatial characteristic tracking system 704, and may use this data to generate a 3D simulation of bounded real-world scene 404 within which each object 406 is simulated in accordance with their respective tracked spatial characteristics. For example, simulation generation system 706 may use the boundaries of an event, the motion of the subjects (e.g., the players, the ball, etc. in the tennis match example) to create a 3D model of the event (e.g., such as the tennis match). In some examples, simulation generation system 706 may add audio to the 3D model that corresponds to audio recorded within bounded real-world scene 404.

Additionally, in certain implementations, simulation generation system 706 may be configured to perform segmentation of the event to identify important milestones in an event. For instance, in the tennis match example, such milestones may include things such as a serve, a change in who is serving, the end of a set in the tennis match, the end of the tennis match, and so forth. In some examples, simulation generation system 706 may identify such milestones automatically, whereas in other examples, the milestones may be identified based on manual user input or the like. As described above, the 3D simulation data generated by simulation generation system 706 may be provided to simulation presentation system 708 to be presented in any suitable way and in accordance with any format as may serve a particular implementation.

FIGS. 8A through 8F illustrate exemplary aspects of how 3D simulation system 200-2 may track and predict spatial characteristics of certain real-world objects relative to a real-world scene. Specifically, each of FIGS. 8A through 8F may represent different frames (or portions of frames) captured as 2D video images by video capture devices such as video capture devices 402 or 602. While each of the frames of FIGS. 8A through 8F are shown to depict objects in a relatively close-up manner, it will be understood that the same principles may apply to wider angle images, including images that depict several objects rather than just one or two.

As shown in several of FIGS. 8A-8F, spatial characteristics may be estimated and tracked for various types of objects, including people. When determining the pose of a person (e.g., a tennis player in one example), a skeletal model of the person may be generated and markers placed at key points along the skeletal model. For example, markers may be associated with the person's hands, feet, head, and various joints (e.g., elbows, knees, shoulders, waist, etc.). By tracking such markers, system 200 may determine how the body of the person moves and bends and so forth.

Figure 8A:
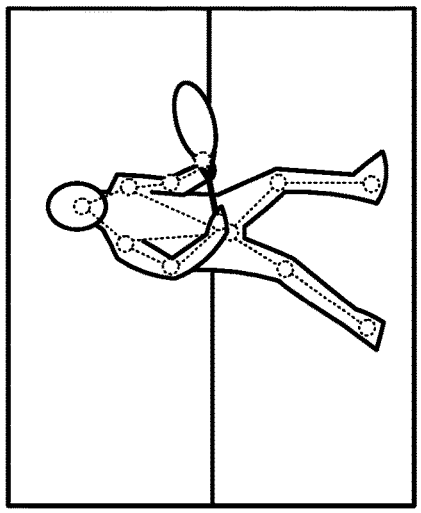
FIGS. 8A through 8F illustrate exemplary aspects of how the 3D simulation system of FIG. 7 tracks and predicts spatial characteristics of certain real-world objects relative to a real-world scene according to embodiments described herein.

To illustrate one particular example, FIG. 8A shows a real-world object that, in this example, happens to be a person holding a tennis racquet (a tennis player). In FIG. 8A, the tennis player is in a ready stance in which markers at various points of interest may each be readily identified. For example, as shown, markers depicted as dotted circles are placed at each of the players feet, hands, and head, as well as at joints including both knees, elbows, shoulders, and the waist. Dotted lines are shown to connect the markers to create a full skeletal model of the player that may be used to track the player's movements as he or she walks around the court, hits the ball with the racquet, and so forth.

Figure 8B:
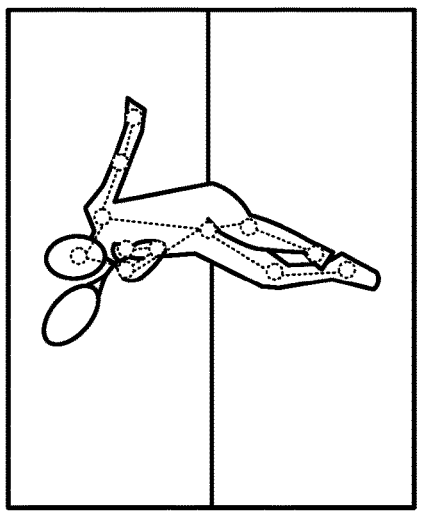

To further illustrate, FIG. 8B shows a different stance that the player may take when preparing to hit the ball during the game. In this example, each of the twelve markers of FIG. 8A and the lines drawn between them are still identifiable, but the skeletal model has taken a significantly different form than the ready stance of FIG. 8A. By tracking the markers as the player moves and contorts in this way, system 200 may generate spatial characteristic data that allow for a 3D model of the player to be posed in accordance with the way the real player has been detected to be posed.

Even when tracking particular markers of a basic skeletal model, various challenges may arise as tracking is performed while the player moves freely in three dimensions. This is particularly true when, as in the examples illustrated in FIGS. 8A-8F, the spatial characteristics are tracked based on a single 2D video image (i.e., a monoscopic image rather than a stereoscopic image or a plurality of images captured from a calibrated formation of vantage points) that is captured from a single angle (e.g., an angle that may be non-optimal such as by being too close, too wide, non-ideal for seeing each of the markers, monoscopic rather than stereoscopic, etc.).

Figure 8C:
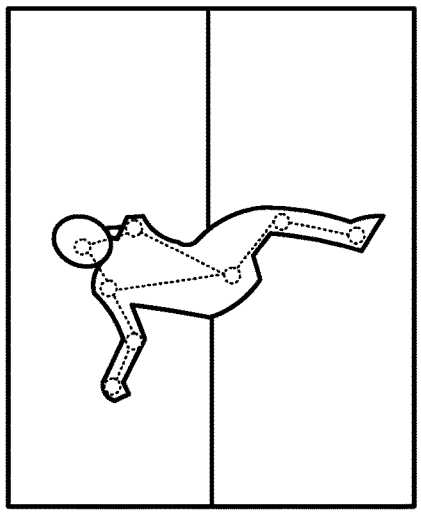

To illustrate some of the potential difficulties that may be faced, FIG. 8C depicts an image in which the real-world object being tracked is a person present within the bounded real-world scene (e.g., the tennis player) and the person has a plurality of body parts including one or more particular body parts that are not shown in the image of FIG. 8C due to the angle of the camera and the orientation of the body. Specifically, as shown, the capture device angle is from the back of the person while body is in a similar pose as shown from the front view in FIG. 8B. In this case, the tracking of the pose of the player includes tracking particular body parts such as the left leg and the right arm for a frame of the 2D video image within which these particular body parts are not depicted due to being occluded (e.g., by other body parts in this example) from a vantage point of the video capture device. More particularly, as shown, markers for the left hand and elbow, for the head and waist, for both shoulders, and for the right knee and foot are all identifiable in this image. However, the markers for the right hand and elbow, as well as for the left knee and foot, are not visible or identifiable in this image. Accordingly, it may be challenging for system 200 to successfully track the pose and recognize that the arm and leg have not disappeared but are merely not visible in this frame.

Figure 8D:
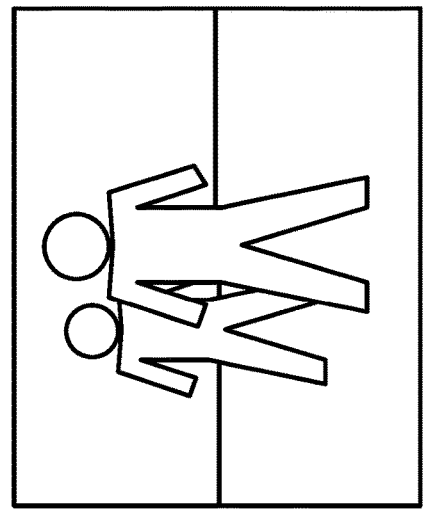

FIG. 8D illustrates another exemplary challenge. In this image, the real-world object being tracked is also a person within the bounded real-world scene (i.e., the person in the foreground, rather than the person standing behind him or her). In this example, however, rather than the orientation of the body obscuring certain markers, the challenge is to successfully differentiate the person from various body parts of a different person who is also present within the bounded real-world scene and whose body parts happen to be, from the vantage point of the video capture device capturing the image of FIG. 8D, contiguous with the depiction of the person within the frame of the 2D video image. For example, as shown, the other person is colinear with the person being tracked and the vantage point of the video capture device, such that system 200 must recognize that another person is in the frame, rather than that, for example, the person being tracked has grown additional limbs, has suddenly moved his or her head or limbs to an inaccurate position, or the like. This situation may occur, for instance, when what appears to be a new arm on a player is actually overlap of the player with a referee who is standing close to the player, or if another person walks in front of a player, or the like.

In order to handle pose estimation challenges such as those illustrated by FIGS. 8C and 8D and/or other spatial characteristic tracking challenges that may be introduced in other examples, system 200 (or specific components thereof, such as spatial characteristic tracking system 704) may be configured to employ machine learning technology that has been trained based on a plurality of events that are similar to, and that have occurred prior to, an event associated with the 2D video image. For instance, to help resolve the tennis-related challenges of FIGS. 8C and 8D, machine learning technology may be employed that has been trained based on previous tennis matches, including, for example, matches televised by the same content provider, matches including one or both of the same players (or players performing at a similar level), and so forth. The tracking of the pose in FIG. 8C and/or FIG. 8D may therefore be performed using the machine learning technology.

In certain examples, machine learning may be used to track any spatial characteristics from 2D content such as the 2D video images shown in FIGS. 8C and 8D (as well as the other 2D video images shown in FIGS. 8A-8F) and to generate data that represents the spatial characteristics. Such data may be provided to a 3D graphics simulation engine (e.g., a video game engine or the like) incorporated within a simulation generation system (e.g., simulation generation system 706) or a simulation presentation system (e.g., simulation presentation system 708). In this way, the machine learning algorithm and training procedures may enable system 200 to reliably perform the spatial characteristic tracking without needing to rely extensively on a manually programmed tracking algorithm.

As used herein, machine learning technology may refer to any type of machine learning or artificial intelligence or other similar type of technology. For instance, machine learning technologies may include one or more neural networks, deep neural networks, convolutional neural networks, recurrent neural networks, training sets (e.g., videos of human body movements, videos of tennis matches, etc.), and/or any other components as may serve a particular implementation. The advantage of a recurrent neural network is that such a network may be configured to "remember" certain motion so as to not treat subsequent motions as being new events each time the motions occur. Additionally, machine learning may be used to designate classifiers to identify specific individuals present in a particular scene or at a particular real-world event. For instance, players and other people that participate in an event (e.g., a referee, a coach, etc.) may be classified in some examples, while everyone who can be identified (e.g., including people in the audience) may be classified in other examples. In certain implementations, such person classification may be performed by associating user profiles from social media with the identified people. Leveraging the power of machine learning technologies may allow system 200 to create 3D models and simulations in real time.

In some examples, machine learning technologies may also improve 3D simulation in other ways besides helping perform accurate pose estimation, object identification and differentiation, and so forth. For instance, in some examples, machine learning may assist in capturing and generating high quality volumetric models and/or 3D simulations by intelligently filling in gaps that may occur due to vantage points of video capture devices failing to capture certain motions or certain parts of particular objects. As another example, machine learning technologies may enable system 200 to make predictions about how objects will move in the scene before the objects actually move. For example, machine learning may predict the motion of a player in the tennis match example (e.g., a person hitting a ball), the motion of a ball as it bounces in accordance with the laws of physics, the motion of a net as a ball is hit into it at a particular speed, and so forth.

Figure 8E:
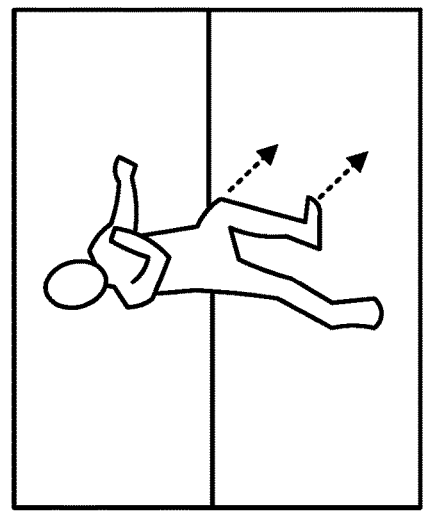

To illustrate, FIG. 8E shows how a person may be predicted to move based on the current stance of the person and/or based on physics or the like. In FIG. 8E, the person is shown to have a leg up in the air, but to be leaning such that his or her center of gravity will necessitate the leg coming down if the person does not wish to fall. Accordingly, system 200 may predict, at a first time and based on the 2D video image of FIG. 8E, the spatial characteristic shown by the dotted arrows in FIG. 8E (i.e., that the leg of the person will drop to catch the person from falling) as that spatial characteristic will be detected at a second time that occurs after the first time. Later, assuming that the leg does fall into place as shown by the arrows, system 200 may perform the tracking of the spatial characteristic (e.g., the pose and/or movement of the leg or of the person) at the second time based on the prediction that was made at the earlier time (i.e., the first time).

Figure 8F:
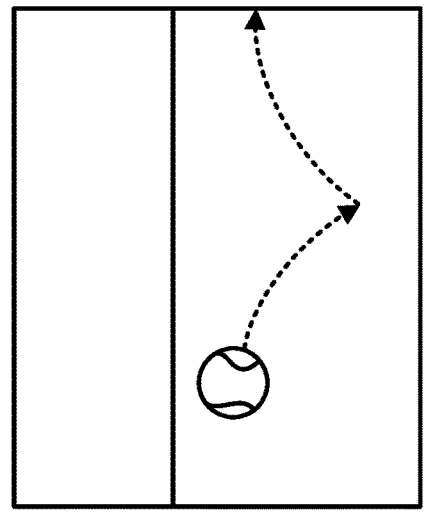

As another example, FIG. 8F shows how a prediction may be made for a tennis ball based on fundamental laws of physics that define how a free body such as a ball moves through space, bounces, and so forth. System 200 may track the location of the ball for each frame of a particular 2D video image based on such predictions. In some examples, system 200 may make predictions by first determining various characteristics of the ball such as the launch velocity, speed of the ball, spin of the ball, certain modifications due to wind resistance, a height of the ball from the ground, and so forth. Then, based on these characteristics and basic laws of physics programmed into a prediction engine of system 200, the 3D trajectory of the ball may be predicted (e.g., see the dotted arrows in FIG. 8F) prior to the ball actually moving in that manner. In certain implementations, system 200 may be configured to minimize reprojection error, which is a difference between what a video capture device detects and where an object such as the ball is estimated to be located.

Returning to FIG. 3, system 200 (e.g., any of the implementations of system 200 described above in relation to FIGS. 4-7) and video capture system 302 may be configured to communicate with one another, as well as with media player devices 308 that at least partially implement volumetric presentation system 508 and/or simulation presentation system 708, by way of network 306.

In some examples, network 306 may include or be implemented by a provider-specific wired or wireless communication network (e.g., a cellular network used for mobile phone and data communications, a 4G or 5G network or network of another suitable technology generation, a cable or satellite carrier network, a mobile telephone network, etc.) that is operated and/or managed by a provider entity such as a mobile network operator (e.g., a wireless service provider, a wireless carrier, a cellular company, etc.). For instance, the provider of such a provider network may own or control all of the elements necessary to sell and deliver communications services to users 310, including radio spectrum allocation, wireless network infrastructure, back haul infrastructure, customer care, provisioning of devices, network repair for network 306, and so forth.

Additionally or alternatively, network 306 may include or be implemented by any interconnected network infrastructure that is external to a provider network and outside of the control of a specific network provider. For example, network 306 may include the Internet, a wide area network, a content delivery network, and/or any other suitable network or networks. In any case, network 306 may be configured to provide data delivery between server-side provider systems (e.g., system 200, video capture system 302, etc.) and client-side systems and devices (e.g., media player devices 308). To this end, network 306 may implement or employ any suitable communication technologies, devices, media, protocols, or the like as may serve a particular implementation.

Media player devices 308 may be implemented as (or may be included within) any suitable computing system or device as may be employed for performing any of the use cases or applications described herein. Specifically, for example, each media player device 308 may include one or more display screens (e.g., traditional display screens, partially transparent heads-up display ("HUD") screens, computer monitors, etc.) configured to display rendered graphics representative of an extended reality world, a 3D volumetric model, a 3D simulation, or any other graphical presentation as is provided by the media player device 308. Various media player devices 308 may be implemented as mobile devices (e.g., smartphones, tablet computing devices, etc.), as virtual or augmented reality devices (e.g., head-mounted devices configured to display graphics directly in front of each eye of a respective user 310), as portable or stationary computing devices (e.g., personal desktop or laptop computers, etc.), as television devices (e.g., set top boxes, network-enabled televisions, etc.), or as any other systems or devices as may serve a particular implementation.

Accordingly, users 310 may represent any persons viewing graphics presented by respective media player devices 308 and will be understood to have, in certain implementations, some degree of control over what graphics media player devices 308 present. For instance, a user 310 may indicate a particular viewpoint, within an extended reality world corresponding to a bounded real-world scene captured by video capture devices 304, from which the user 310 wishes to view the world by moving an avatar or virtual camera around within the extended reality world. As the user 310 navigates in this manner, his or her media player device 308 may be configured to render the extended reality world from the desired viewpoint based on extended reality media content provided by system 200. In the same or other implementations, a user 310 may control a timeline that is being presented. For example, the user 310 may control whether an event is to be simulated live (e.g., showing a 3D simulation of the tennis match as a 2D stream of the tennis game is broadcast onto a nearby television), or if the event is to be paused or otherwise manipulated (e.g., rewinding the content to replay a particular portion such as a particular serve in the tennis match, etc.).

Figure 9:
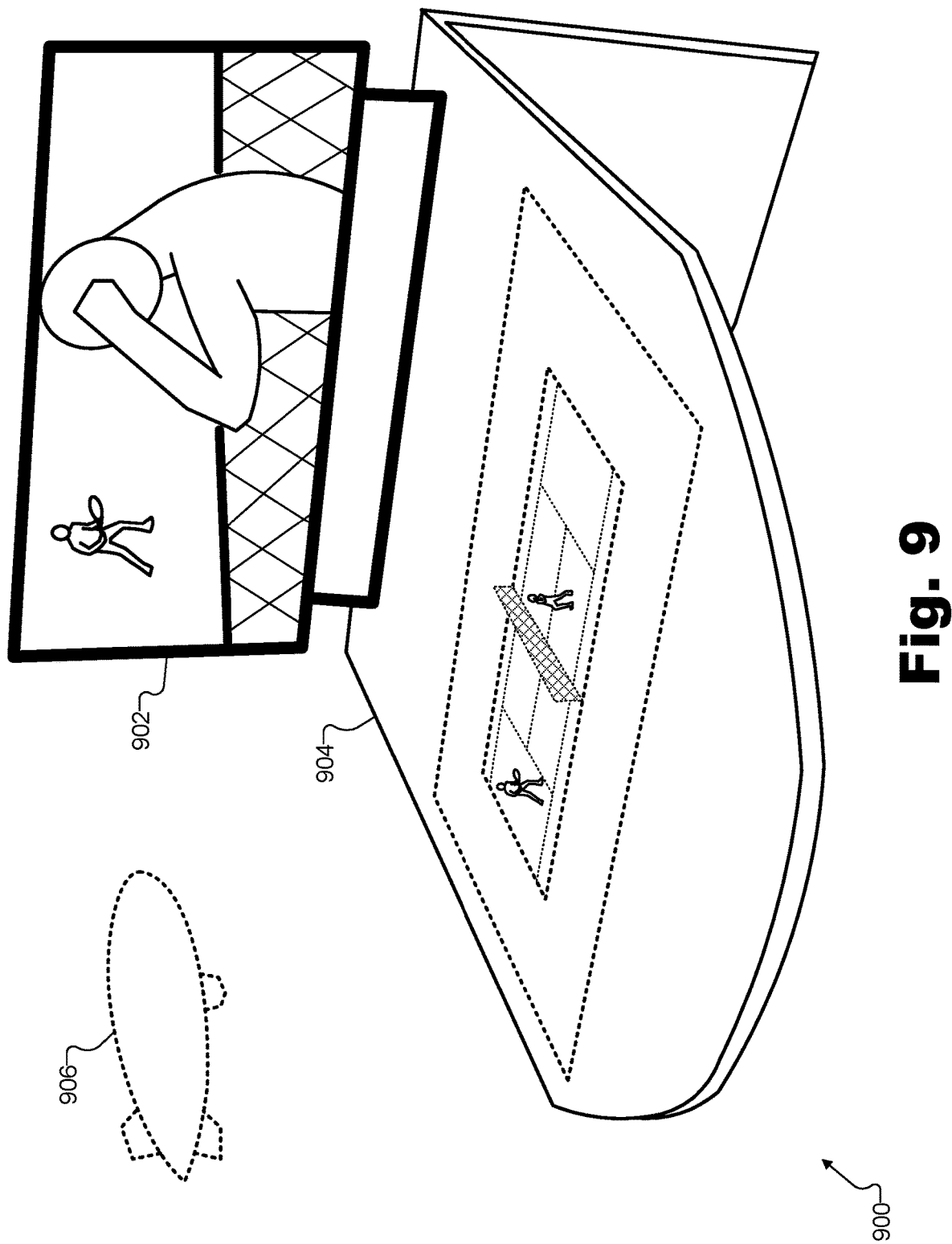
FIG. 9 illustrates an exemplary 3D simulation presented as an augmentation viewable by way of an augmented reality media player device according to embodiments described herein.

To illustrate this latter type of implementation, FIG. 9 shows an exemplary 3D simulation 900 presented as an augmentation viewable by way of an augmented reality media player device. In this example, system 200 may be implemented as a 3D simulation system such as 3D simulation system 200-2. The 3D simulation system is not explicitly shown in FIG. 9, but will be understood to be providing 3D simulation content to an augmented reality media player device that is worn by a user who sees, by way of the augmented reality media player device, what is shown in FIG. 9. Specifically, the user in this example may see a television screen 902 that is presenting a televised 2D video image that is captured by a television camera and broadcast to viewers who are not at the event. In this example, for instance, the televised 2D video image is shown to depict a tennis match event, and, as such, may depict a bounded real-world scene within which the tennis match is occurring (e.g., the tennis court), and a person associated with the tennis match and present within the bounded real-world scene (e.g., a tennis player).

The 3D simulation system 200-2 may receive the televised 2D video image and access a 3D model of the bounded real-world scene and a 3D model of the person associated with the televised real-world event. Thus, for example, 3D simulation system 200-2 may access 3D models of the tennis court, each player, and any other objects (e.g., the net, the ball, the racquets, etc.) as may be present on the court. 3D simulation system 200-2 may then track, based on the televised 2D video image, a pose of each person and/or inanimate object relative to the bounded real-world scene (e.g., where the pose comprises a combination of a spatial orientation of the person or object and a spatial location of the person or object). As shown, for instance, as 3D simulation system 200-2 tracks the players shown on television 902 based on the televised 2D video image or other images provided that are not shown on television 902, 3D simulation system 200-2 may recognize that one player is in the ready stance a few meters back from the net on his or her side of the tennis court, while the other player is walking nearer the net on his or her side of the court and holding his or her hand near his or her head.

Accordingly, 3D simulation system 200-2 may present 3D simulation 900 as an augmentation viewable by way of the augmented reality media player device. Specifically, as shown, a virtual bounded tennis court in which each player is simulated in accordance with the tracked pose is presented next to television 902 on a table 904 that is in a vicinity of the display screen of television 902 as the display screen presents the televised tennis match (e.g., including by presenting audio such as a commentator describing the actions in the game, etc.). Along with the bounded tennis court augmentation, 3D simulation 900 is also shown to include other aspects of the augmentation, such as a virtual blimp 906 that is floating above the tennis court and/or any other such augmentations as may serve a particular implementation. Such additional 3D content may provide, in certain examples, monetization opportunities for advertisers to pay for their logo to be present within the 3D content. For instance, system 200 may determine an identity of the user and display advertisements that are personalized for the user in certain implementations (e.g., if the user is interested in cars, system 200 may select a LEXUS advertisement to integrate into the 3D simulation such as to be displayed on blimp 906).

In some implementations, the augmentations of 3D simulation 900 may be delivered to an augmented reality media player device as part of bonus content that a user becomes entitled to view after purchasing viewing rights to an event such as the tennis match. In other implementations, the 3D simulation 900 may be provided for free as part of the 2D broadcast of the televised event as an enticement to make users want to tune in and watch the event (including by viewing advertisements and so forth). While 3D simulation 900 is shown to be a small augmentation presented on a tabletop of table 904 in FIG. 9, it will be understood that the 3D simulation may be configured to appear larger in some other location as may be appropriate in the space of a given room where a user is watching the televised event. For instance, a larger 3D simulation similar to 3D simulation 900 could be presented on the floor on one side of a room or even on a stage of a theater, depending on the circumstances of the viewing room in which the user is watching the event.

Additionally, in certain examples, rather than being presented as an augmentation viewable by way of an augmented reality media player device, 3D simulation 900 may be presented in another format on another type of media player device. For example, 3D simulation 900 may be presented on a 2D screen such as the display screen of a laptop, the display screen of a mobile device, in a corner of the display screen of television 902, or another suitable display screen of another suitable media player device. In such examples, system 200 may determine the capabilities of the media player device that will display the 3D simulation and may selectively present 3D content based on what the media player device is capable of displaying. For example, if the media player device is a smartphone, the 3D simulation content may not have as much detail as if the media player device includes augmented reality viewing goggles.

In some examples, a user interface may be made available to the user to allow for control of how he or she views the televised real-world event. For example, the user interface may be associated with television 902 (e.g., a remote control, etc.), with the media player device used to view 3D simulation 900 (e.g., a controller of an augmented reality media player device, etc.), or with any other integrated or independent control interface as may serve a particular implementation. In such examples, the user may manipulate the user interface in order to view the game, pause the game, rewind, fast forward, or select (e.g., skip to) different specific points in the event (e.g., such as a serve, a point, a game, and a set of the tennis match event). The user interface may be configured based on the type of event is being viewed. For instance, while the example above describes a user interface configured specifically for a tennis match, other types of user interfaces (e.g., with other buttons, etc.) may be employed for other types of sporting events (e.g., soccer, football, basketball, lacrosse, baseball, etc.) or for real-world events that are not sporting events (e.g., music concerts having user interfaces that include buttons to move from song to song, etc.). In some embodiments, the user interface may include an option to bookmark part of the real-world event for later viewing.

Additionally, in certain implementations, the user interface may include an option for synchronized viewing where two different users can view the real-world event on their respective media player devices at substantially the same time. For instance, the user interface may include an option for the users to participate in the same viewing experience on their respective media player devices such that a first viewer could view a second viewer's selection of different user interface buttons and subsequent playback of particular events.

Figure 11:
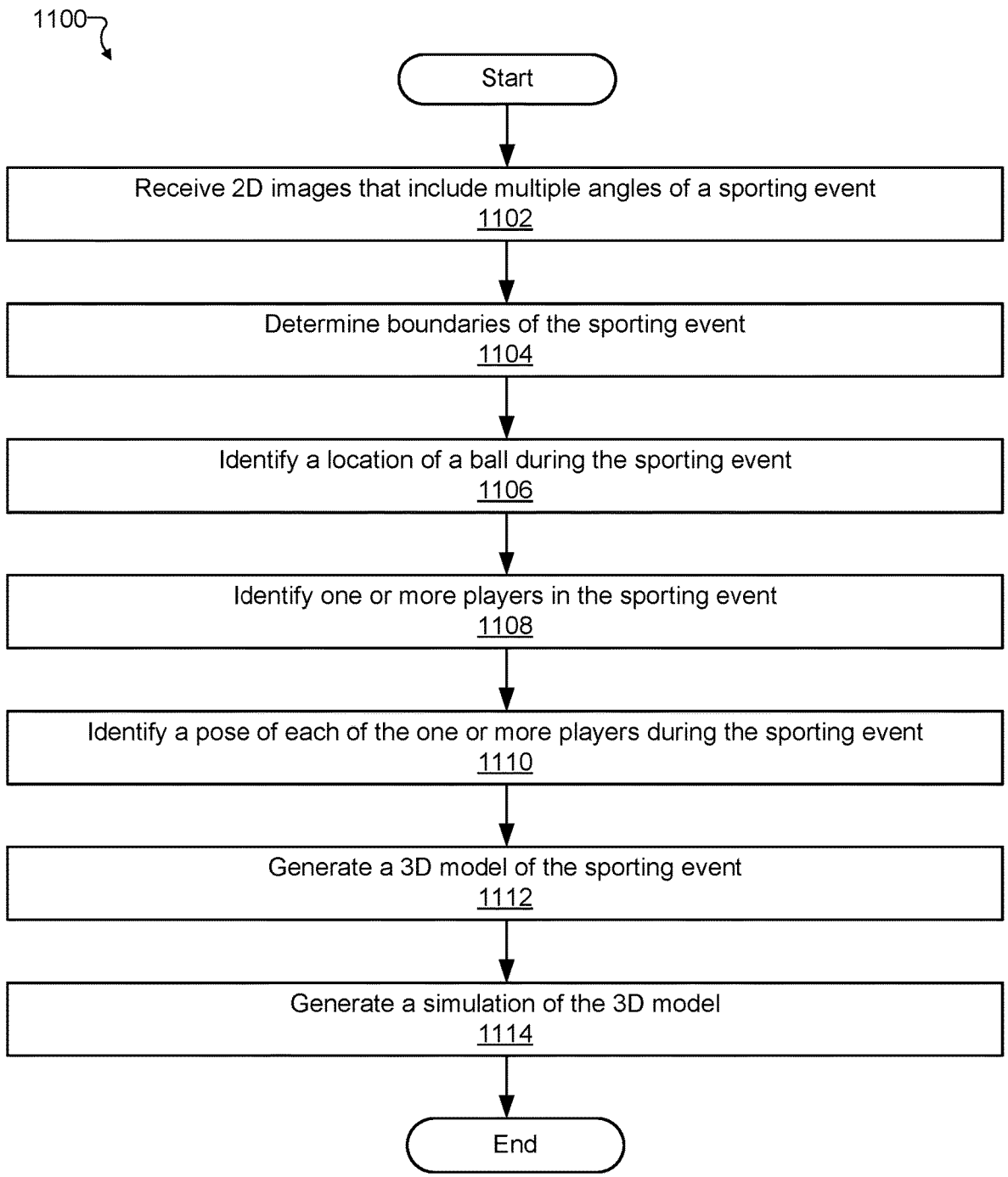
Figure 12:
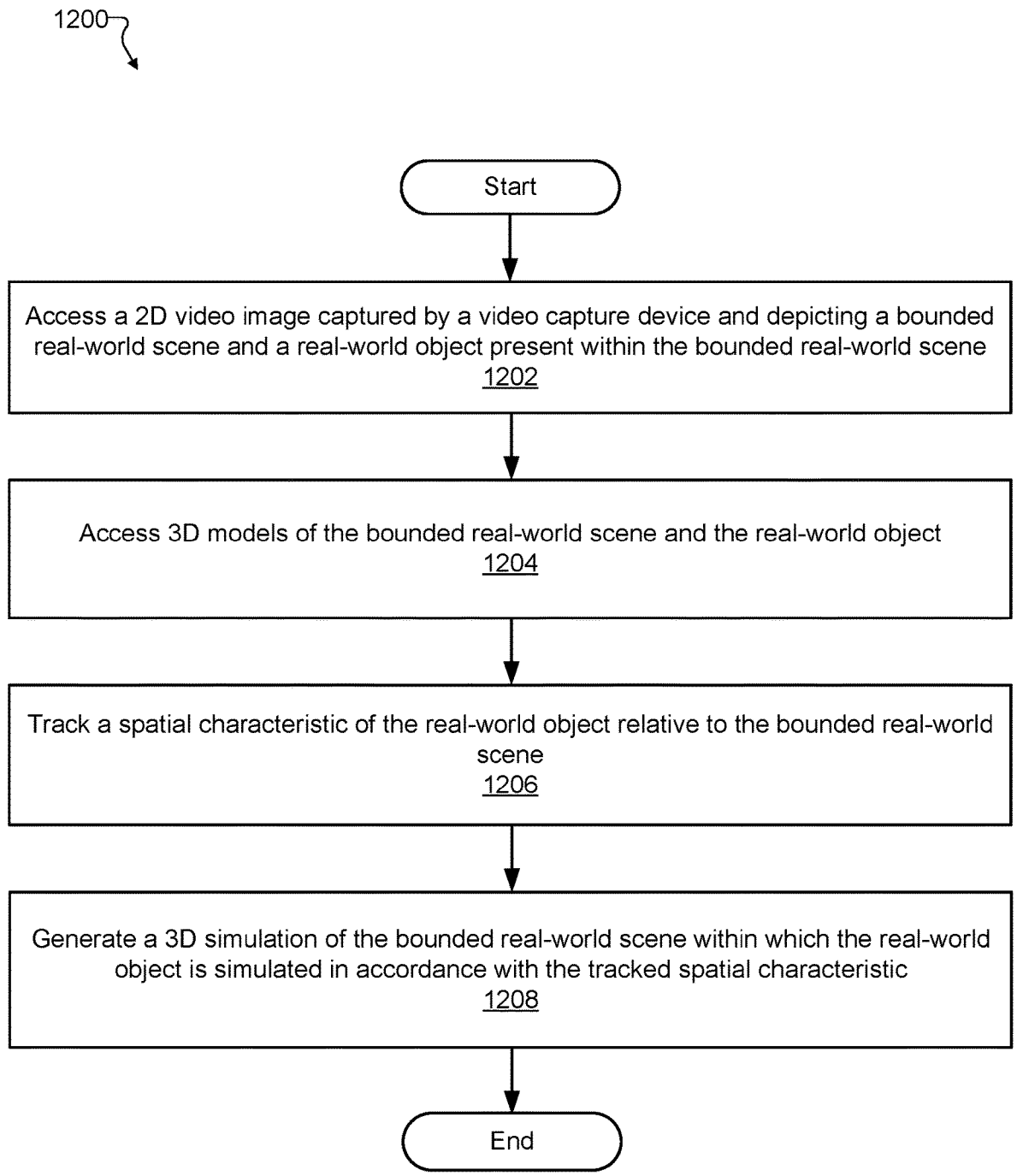
Figure 13:
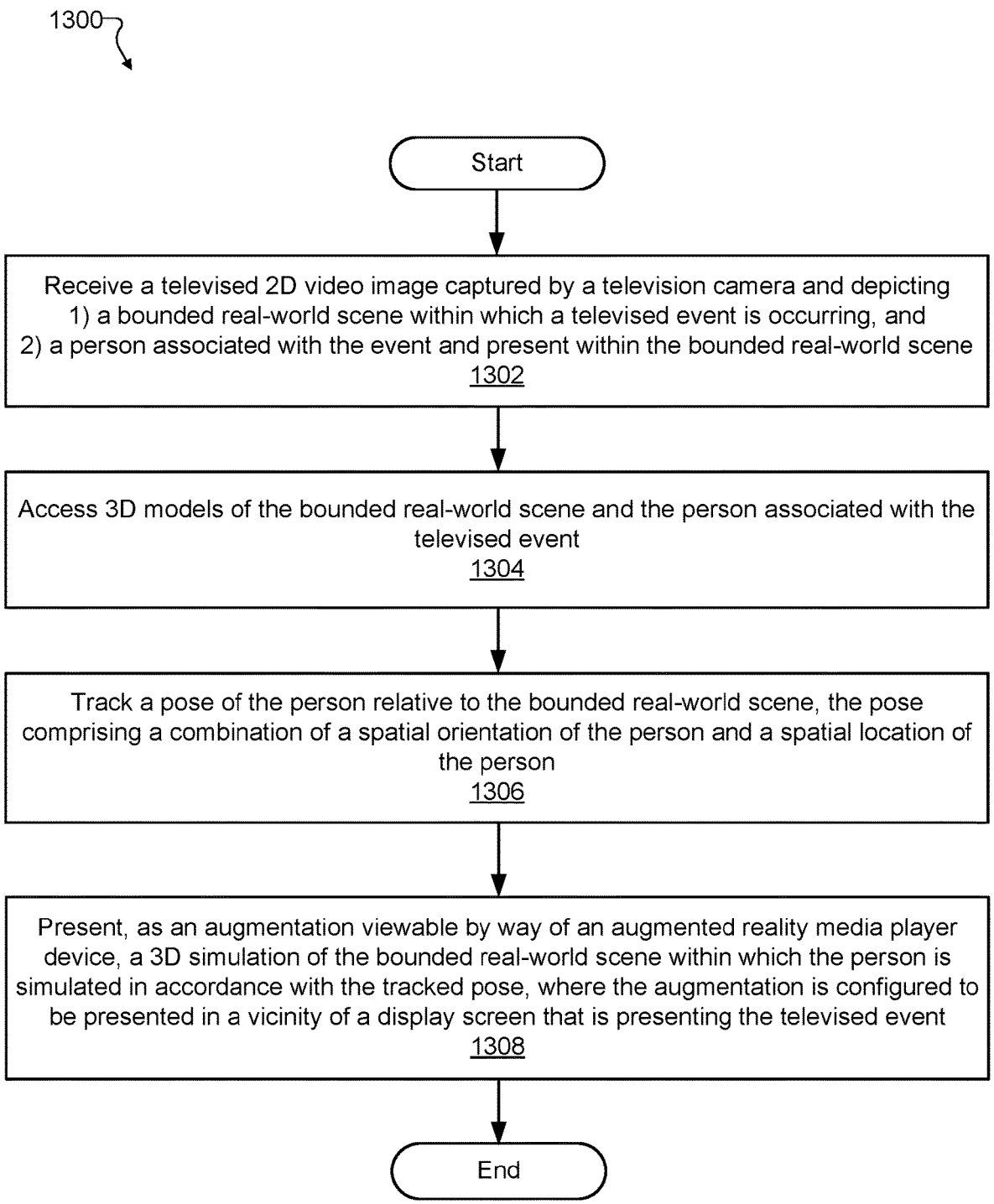

To further illustrate certain methods for generating 3D content based on one or more 2D video images, several method flowcharts will now be described in relation to FIGS. 10-13. Specifically, FIG. 10 illustrates a method that may be performed by a volumetric modeling system implementation of the 3D content generation systems described herein, while FIGS. 11-13 illustrate respective methods that may be performed by 3D simulation system implementations of the 3D content generation systems described herein.

Figure 10:
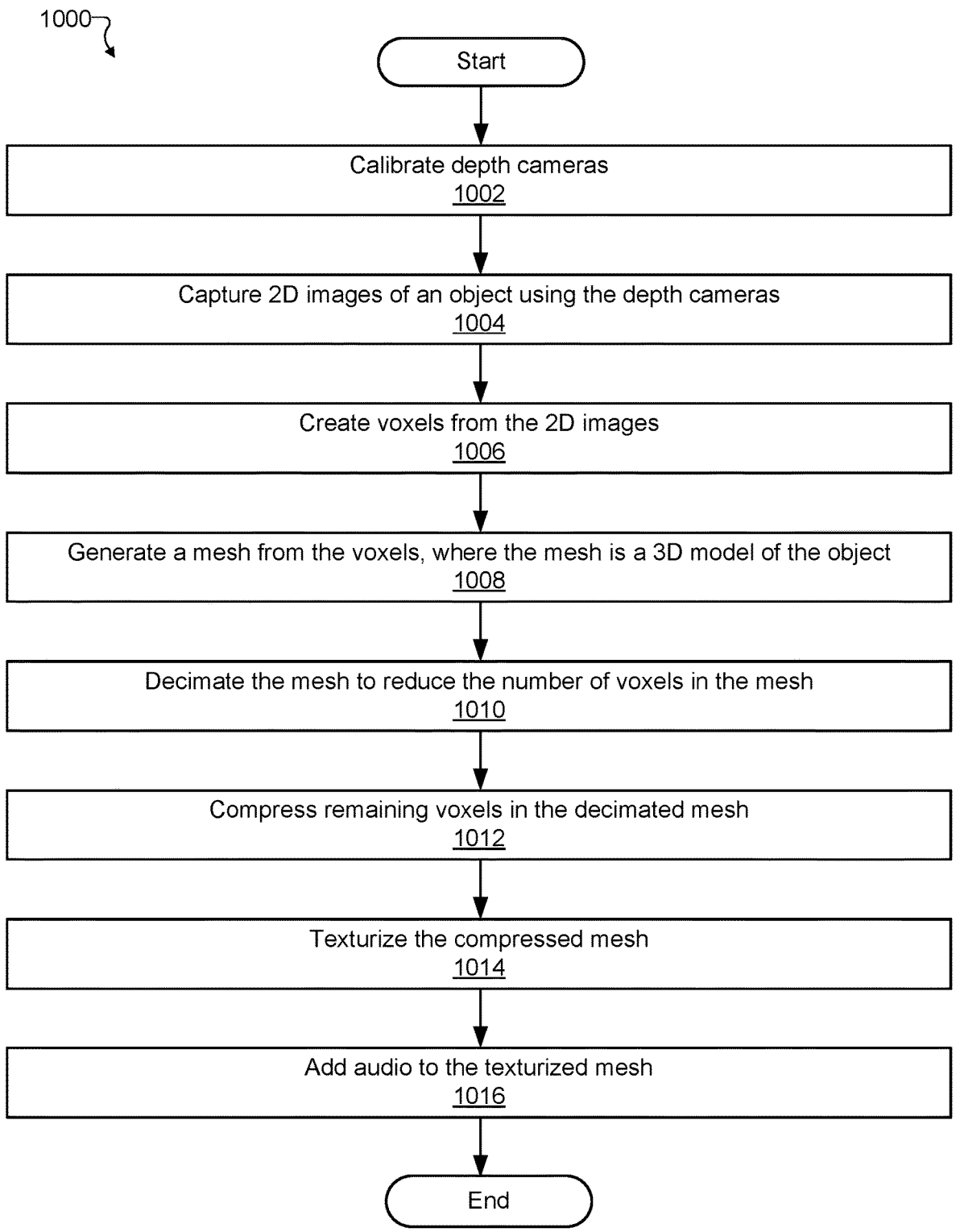
FIGS. 10-13 illustrate various exemplary methods for generating 3D content based on 2D video images according to embodiments described herein.

FIG. 10 illustrates an exemplary method 1000 for generating a volumetric 3D model based on a plurality of 2D video images. While FIG. 10 illustrates exemplary operations according to one embodiment, other embodiments may omit, add to, reorder, and/or modify any of the operations shown in FIG. 10. As mentioned above, one or more of the operations shown in FIG. 10 may be performed by system 200, any components included therein, and/or any implementation thereof. For instance, the operations may be performed by a volumetric modeling system implementation of system 200 such as volumetric modeling system 200-1.

In operation 1002, a volumetric modeling system implementation of a 3D content generation system (a "volumetric modeling system") may calibrate video capture devices that capture not only color data but also depth data. In some examples, this calibration may involve determining intrinsic parameters for individual video capture devices and/or determining extrinsic parameters that define a calibrated formation for a plurality of video capture devices. Operation 1002 may be performed in any of the ways described herein.

In operation 1004, the volumetric modeling system may capture 2D video images of a real-world object using the color video capture devices and/or depth capture devices calibrated in operation 1002. The object may be any real-world object such as a person, an inanimate object, or any other suitable object described herein or as may serve a particular implementation. Operation 1004 may be performed in any of the ways described herein.

In operation 1006, the volumetric modeling system may use the 2D video images (e.g., the color and/or the depth data) captured at operation 1004 to create voxels from the 2D video images. Operation 1006 may be performed in any of the ways described herein.

In operation 1008, the volumetric modeling system may use the voxels created at operation 1006 to generate a mesh for the object. As has been described, the mesh may serve as a basis of a volumetric 3D model of the object. For example, the mesh may act as an untextured wireframe of the 3D model upon which other data such as color and texture data, audio data, and so forth can be added to complete the 3D model. Operation 1008 may be performed in any of the ways described herein.

In operation 1010, the volumetric modeling system may decimate the mesh generated at operation 1008. For example, by decimating the mesh, the 3D model may become significantly simplified for easier processing and storage by reducing the number of voxels in the mesh. Operation 1010 may be performed in any of the ways described herein.

In operation 1012, the volumetric modeling system may compress the voxels that remain in the mesh after the decimating of operation 1010 has been performed to reduce the number of voxels. Operation 1012 may be performed in any of the ways described herein.

In operation 1014, the volumetric modeling system may texturize the mesh compressed at operation 1012. For example, based on metadata stored for different voxels or triangles of the compressed mesh, the volumetric modeling system may apply texture from a texture atlas based on captured 2D color data to finish the volumetric 3D model by making the model look like the object, along with taking the shape and form of the object. Operation 1014 may be performed in any of the ways described herein.

In operation 1016, the volumetric modeling system may add audio to the mesh that has been texturized at operation 1014. With this final step, a full volumetric 3D model that mirrors the original real-world object in both look and sound has been generated and may be provided to any suitable system (e.g., a media player device) for presentation to a user. Operation 1016 may be performed in any of the ways described herein.

FIG. 11 illustrates an exemplary method 1100 for performing 3D simulation based on a 2D video image. While FIG. 11 illustrates exemplary operations according to one embodiment, other embodiments may omit, add to, reorder, and/or modify any of the operations shown in FIG. 11. As mentioned above, one or more of the operations shown in FIG. 11 may be performed by system 200, any components included therein, and/or any implementation thereof. For instance, the operations may be performed by a 3D simulation system implementation of system 200 such as 3D simulation system 200-2.

In operation 1102, a 3D simulation system implementation of a 3D content generation system may receive at least one 2D video image. As described above, while only one image may be necessary, it may often be the case that the 3D simulation system receives a plurality of 2D video images associated with a plurality of different vantage points or angles of the sporting event, such as one or more 2D video images from a bird's eye view of the sporting event and close-up 2D video images for each player and so forth. Operation 1102 may be performed in any of the ways described herein.

In operation 1104, the 3D simulation system may determine boundaries of the sporting event being captured by the 2D video images referred to with respect to operation 1102. For example, if the sporting event is a tennis match, the 3D simulation system may determine the boundaries of the tennis court. Operation 1104 may be performed in any of the ways described herein.

In operation 1106, the 3D simulation system may identify a location of a ball during the sporting event by determining or detecting where the ball is based on one or more of the 2D video images. In some examples, the 3D simulation system may determine the location of the ball in each frame of one or more of the 2D video images for the sporting event. Operation 1106 may be performed in any of the ways described herein.

In operation 1108, the 3D simulation system may identify one or more of the players in the sporting event. For example, if the sporting event is a tennis match, the 3D simulation system may identify each of the two tennis players so that 3D models specific to the particular players may be accessed and simulated. Operation 1108 may be performed in any of the ways described herein.

In operation 1110, the 3D simulation system may identify one or more current spatial characteristics of each of the one or more players during the sporting event. For instance, in the tennis example, the pose of the players may be tracked as they move around the tennis court and hit the ball back and forth. Operation 1110 may be performed in any of the ways described herein.

In operation 1112, the 3D simulation system may generate a 3D model of the sporting event. For example, after accessing individual 3D models of the ball identified at operation 1106, of each of the players identified at operation 1108, of the real-world scene (e.g., the tennis court) itself, and of any other objects included thereon, the 3D simulation system may aggregate all of these 3D models into a single aggregated 3D model of the sporting event (e.g., a 3D model of the tennis match). Operation 1112 may be performed in any of the ways described herein.

In operation 1114, the 3D simulation system may generate a simulation of the aggregated 3D model generated at operation 1112. Specifically, for example, after aggregating all of the individual 3D models for the ball and players and other objects, the 3D simulation system may cause the objects to move in a manner that replicates the movement of the ball, the pose of the players, and so forth. In this way, a 3D simulation of the sporting event is generated that may be provided to a suitable presentation system for presentation to a user. Operation 1114 may be performed in any of the ways described herein.

FIG. 12 illustrates an exemplary method 1200 for performing 3D simulation based on a 2D video image. While FIG. 12 illustrates exemplary operations according to one embodiment, other embodiments may omit, add to, reorder, and/or modify any of the operations shown in FIG. 12. As mentioned above, one or more of the operations shown in FIG. 12 may be performed by system 200, any components included therein, and/or any implementation thereof. For instance, the operations may be performed by a 3D simulation system implementation of system 200 such as 3D simulation system 200-2.

In operation 1202, a 3D simulation system implementation of a 3D content generation system may access a 2D video image. For example, the 2D video image may be captured by a video capture device and may depict a bounded real-world scene and a real-world object present within the bounded real-world scene. Operation 1202 may be performed in any of the ways described herein.

In operation 1204, the 3D simulation system may access a 3D model of the bounded real-world scene and a 3D model of the real-world object. Operation 1204 may be performed in any of the ways described herein.

In operation 1206, the 3D simulation system may track a spatial characteristic of the real-world object relative to the bounded real-world scene. For instance, the 3D simulation system may track the spatial characteristic based on the 2D video image accessed at operation 1202. Operation 1206 may be performed in any of the ways described herein.

In operation 1208, the 3D simulation system may generate a 3D simulation based on the spatial characteristic tracked at operation 1206 and based on the 3D models of the bounded real-world scene and the real-world object accessed at operation 1204. As such, the 3D simulation generated at operation 1208 may be a 3D simulation of the bounded real-world scene within which the real-world object is simulated in accordance with the tracked spatial characteristic of the real-world object. Operation 1208 may be performed in any of the ways described herein.

FIG. 13 illustrates an exemplary method 1300 for performing 3D simulation based on a 2D video image. While FIG. 13 illustrates exemplary operations according to one embodiment, other embodiments may omit, add to, reorder, and/or modify any of the operations shown in FIG. 13. As mentioned above, one or more of the operations shown in FIG. 13 may be performed by system 200, any components included therein, and/or any implementation thereof. For instance, the operations may be performed by a 3D simulation system implementation of system 200 such as 3D simulation system 200-2.

In operation 1302, a 3D simulation system implementation of a 3D content generation system may receive a televised 2D video image. For example, the televised 2D video image may be captured by a television camera and may depict a bounded real-world scene within which a televised real-world event is occurring. The televised 2D video image may also depict a person associated with the televised real-world event and present within the bounded real-world scene. Operation 1302 may be performed in any of the ways described herein.

In operation 1304, the 3D simulation system may access a 3D model of the bounded real-world scene and a 3D model of the person associated with the televised real-world event. Operation 1304 may be performed in any of the ways described herein.

In operation 1306, the 3D simulation system may track a pose of the person relative to the bounded real-world scene. For example, the 3D simulation system may track the pose based on the televised 2D video image accessed at operation 1302 or based on another 2D video image depicting at least part of the person and at least part of the bounded real-world scene. In some examples, the pose being tracked at operation 1306 may comprise a combination of a spatial orientation of the person and a spatial location of the person relative to the bounded real-world scene. Operation 1306 may be performed in any of the ways described herein.

In operation 1308, the 3D simulation system may present a 3D simulation of the bounded real-world scene as an augmentation viewable by way of an augmented reality media player device. For example, the 3D simulation presented at operation 1308 may be a 3D simulation within which the person is simulated in accordance with the pose tracked at operation 1306, and may be generated based on the tracked pose of the person and the 3D models accessed at operation 1304 of the bounded real-world scene and the person. Additionally, in certain examples, the augmentation of the 3D simulation may be configured to be presented in a vicinity of a display screen that is presenting the televised real-world event. Operation 1308 may be performed in any of the ways described herein.

In certain implementations, 3D content generation systems described herein may include or be configured to interoperate with additional systems that implement certain functionalities that have not yet been explicitly described.

As one example, a 3D content generation system or related system may be configured with dynamic texture resolution technologies. As another example, the 3D content generation system or related systems may be associated with technologies that blend textures in particular ways. As yet another example, a synchronization system (also referred to herein as a "hardware sync box") may be employed or included within an implementation of 3D content generation system as may serve a particular implementation. Each of these additional systems and functionalities will now be described in more detail.

Dynamic texture resolution technologies may be configured to improve the texture quality that is achievable for streaming assets. For example, certain implementations may be configured to maintain various details of 2D video images in each frame using a minimal downsampling factor that is based on content captured by each video capture device in a plurality of video capture devices capturing a real-world scene.

Conventional texture mapping technologies generally arrange 2D video images from several video capture devices together and downsample the images by a fixed downsampling factor. For example, this fixed factor may be selected based on the final texture size, the number of video capture devices, or other factors. However, since not all the pixels in the 2D video images may necessarily be used for texturing the mesh, dynamic texture resolution may allow the region of interest in each image to be maintained with higher resolution to thereby improve the quality significantly.

To this end, a method for implementing dynamic resolution technology may include any of the following operations, performed in the order given or in any other suitable order. First, a mesh and a UV texture map may be generated from raw full resolution video capture devices that provide color and depth data (e.g., red green blue depth ("RGBD") camera inputs). Second, noise may be removed from the mesh by removing the small mesh group sizes and outliers. Third, used pixels in each 2D video image may be tagged based on 2D portions associated with the full mesh. Fourth, a bounding box may be defined to specify a particular region of interest for each video capture device. Fifth, potential downsampling factors may be determined based on the fixed streaming texture size and/or the size of the bounding box. Sixth, only the texture in the bounding box may be maintained and the downsampling may be applied (if applicable) based on one or more of the potential downsampling factors. Seventh, the UV texture mapping may be updated based on the new texture map that has been downsampled.

This method or a related method may be performed for each frame. In each application of the method, a specific scaling size may be selected based on the available content in each image. As a result of applying this method, the content resolution may be significantly improved as compared to conventional texture mapping techniques, particularly during real-time streaming.

Technologies for blending texture may also be employed in certain implementations. In a real-time multi-camera volumetric capture system, texture maps may be generated by arranging 2D video images from individual video capture devices into a single large atlas image. UV mapping is performed by iterating through all the triangles in the mesh and assigning UV coordinates from the same video capture device to all three vertices of the triangle. The capture device whose normal best aligns with the face normal is chosen for UV assignment. This approach works well in cases where there is no ambiguity regarding the choice of capture device for a given triangle. However, along texture seams where two or more video capture devices are equally viable candidates for UV assignment, hard transitions may be visible in the reconstructed mesh and it may be desirable to reduce the visibility of such transitions. Furthermore, these transitions might appear to change every time the mesh is refreshed, further degrading the viewing experience.

Accordingly, by smoothly blending colors across such texture seams, many objectionable artifacts such as those described above may be reduced and/or eliminated. At a high level, the following texture blending algorithm performs a weighted average of colors between capture device pairs along seams, thus facilitating smooth transition of textures from one capture device to the next.

A method for implementing texture blending in these ways may include any of the following operations, performed in the order given or in any other suitable order. First, the nearest neighbors are identified for each video capture device by comparing the dot product between normals of the video capture devices with an empirical threshold. Second, the normals and depth values of the reconstructed mesh may be rasterized and stored for each video capture device. Third, the rasterized normals may be used to identify a suitable neighboring video capture device (e.g., the most ideal video capture device) for use in pixel-wise blending. Fourth, rasterized depth data may be used to ensure that both the reference video capture device and the neighboring video capture device under consideration for blending have a view of a particular vertex. Fifth, once a candidate neighboring video capture device has been selected, exponential blending may be performed to average pixels from the two video capture devices. As this is performed, the exponent of the blending function may be empirically adjusted to provide optimum seam removal without blurring out fine details in the texture map. The UV mapping remains unchanged after the blending operation. The same UV coordinates now map to the blended texture map, resulting in noticeably smoother textures and reduced seams.

A synchronization system or "hardware sync box" may be employed in certain embodiments. For example, the synchronization system may include both a main component (a "sync master") and a secondary component (a "sync slave") that may interoperate in any suitable manner.

The main component of the synchronization system may be configured to generate and distribute a global clock to synchronize multiple depth capture devices (e.g., INTEL REALSENSE depth cameras, etc.). The main component may incorporate an on-board FPGA module to generate the global clock, which may match with the frequency used by the depth capture devices (e.g., 30.0130 Hz in the example of the INTEL sensors).

The FPGA may output a single-ended clock, which may be converted to one or more differential signals using one or more RS485 transceivers configured to improve noise immunity. The main component of a synchronization system may be capable of driving a plurality of capture devices (e.g., up to 16 capture devices) in a star configuration using standard off-the-shelf network cables (e.g., CAT5 cables, etc.). In addition to the clock signal, the main component may also deliver power (e.g., 5V power in certain examples) to the secondary component(s).

In some examples, the main component of the synchronization system may be implemented on a single printed circuit board ("PCB") housed within a relatively small and portable custom enclosure and configured to be communicatively coupled (e.g., by way of the network cables) with each of the secondary components being served in the synchronization system. The main component may be powered at 5V via an AC/DC wall adapter or in another manner as may serve a particular implementation.

Each secondary component of the synchronization system may also be implemented on a small PCB housed within a respective custom enclosure configured to mount to the back of a particular depth capture device. The secondary components may be configured to receive power and clock signals from the main component via the network cable (e.g., by way of an RJ45 connector). Each secondary component may convert the RS485 clock to a single-ended signal to be voltage-compatible with a Sync input of each respective depth capture device. This signal may be routed to the depth capture device using the mating JST connector thru the side of the housing. Power to the secondary PCB may be 5V and may be sourced from the main component.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 14:
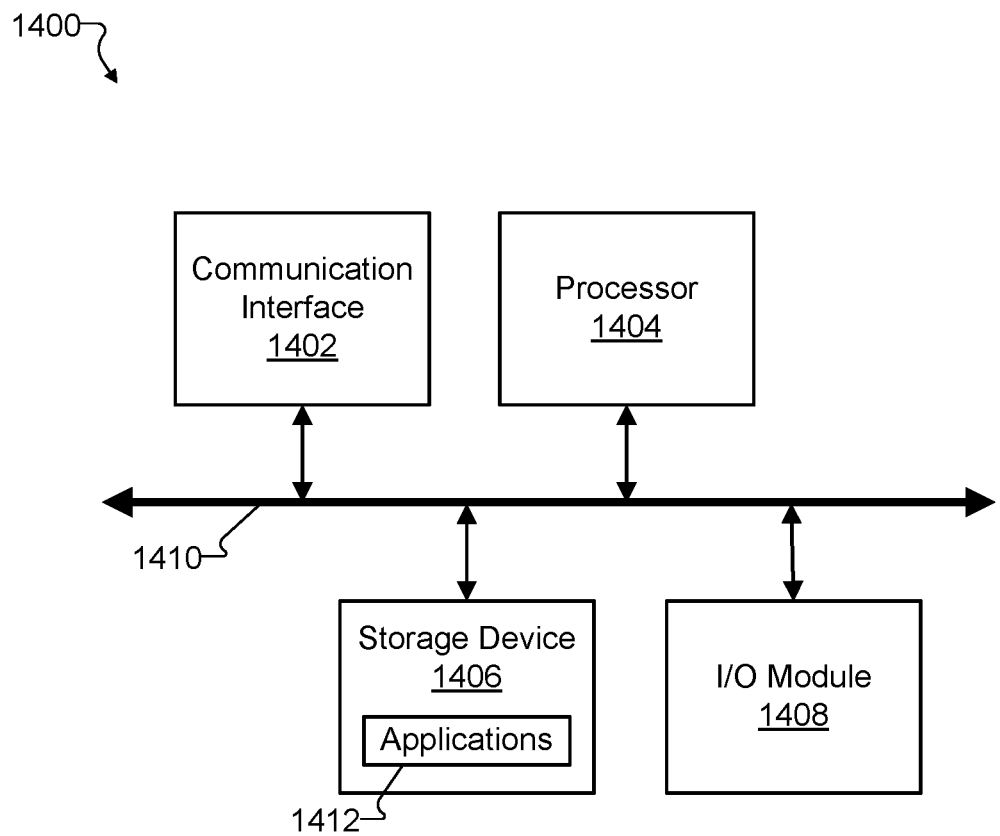
FIG. 14 illustrates an exemplary computing device according to embodiments described herein.

FIG. 14 illustrates an exemplary computing device 1400 that may be specifically configured to perform one or more of the processes described herein. For example, computing device 1400 may implement a 3D content generation system such as system 200, an implementation thereof such as volumetric modeling system 200-1 or 3D simulation system 200-2, or any other system or device described herein (e.g., video capture system 302, video capture devices 304, media player devices 308, volumetric presentation system 508, simulation presentation system 708, an implementation or component of any of these, etc.).

As shown in FIG. 14, computing device 1400 may include a communication interface 1402, a processor 1404, a storage device 1406, and an input/output ("I/O") module 1408 communicatively connected via a communication infrastructure 1410. While an exemplary computing device 1400 is shown in FIG. 14, the components illustrated in FIG. 14 are not intended to be limiting. Additional or alternative components may be used in other embodiments. Components of computing device 1400 shown in FIG. 14 will now be described in additional detail.

Communication interface 1402 may be configured to communicate with one or more computing devices. Examples of communication interface 1402 include, without limitation, a wired network interface (such as a network interface card), a wireless network interface (such as a wireless network interface card), a modem, an audio/video connection, and any other suitable interface.

Processor 1404 generally represents any type or form of processing unit capable of processing data or interpreting, executing, and/or directing execution of one or more of the instructions, processes, and/or operations described herein. Processor 1404 may direct execution of operations in accordance with one or more applications 1412 or other computer-executable instructions such as may be stored in storage device 1406 or another computer-readable medium.

Storage device 1406 may include one or more data storage media, devices, or configurations and may employ any type, form, and combination of data storage media and/or device. For example, storage device 1406 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1406. For example, data representative of one or more executable applications 1412 configured to direct processor 1404 to perform any of the operations described herein may be stored within storage device 1406. In some examples, data may be arranged in one or more databases residing within storage device 1406.

I/O module 1408 may include one or more I/O modules configured to receive user input and provide user output. One or more I/O modules may be used to receive input for a single virtual experience. I/O module 1408 may include any hardware, firmware, software, or combination thereof supportive of input and output capabilities. For example, I/O module 1408 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1408 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1408 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1400. For example, one or more applications 1412 residing within storage device 1406 may be configured to direct processor 1404 to perform one or more processes or functions associated with processing facility 204 of system 200. Likewise, storage facility 202 of system 200 may be implemented by or within storage device 1406.

The separation of various components and servers in the embodiments described herein should not be understood as requiring such separation in all embodiments, and it should be understood that the described components and servers may generally be integrated together in a single component or server. Additions, modifications, or omissions may be made to the illustrated embodiment without departing from the scope of the present disclosure, as will be appreciated in view of the disclosure.

Embodiments described herein contemplate various additions, modifications, and/or omissions to the above-described panoptic virtual presence system, which has been described by way of example only. Accordingly, the above-described capture device system should not be construed as limiting. For example, the 3D content generation systems described herein may include additional and/or different components or functionality than described above without departing from the scope of the disclosure.

Computer-executable instructions described herein will be understood to comprise instructions and data which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware embodiments configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware embodiments or a combination of software and specific hardware embodiments are also possible and contemplated.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
accessing, by a three-dimensional (3D) simulation system, a two-dimensional (2D) video image captured by a video capture device and depicting a real-world event involving a bounded real-world scene and a person present within the bounded real-world scene, the person having a plurality of body parts including a particular body part;
accessing, by the 3D simulation system, a 3D model of the bounded real-world scene and a 3D model of the person, wherein the 3D model of the bounded real-world scene and the 3D model of the person are both preexisting 3D models generated prior to commencement of the real-world event and accessed for use during the real-world event;
tracking, by the 3D simulation system and based on the 2D video image, a pose of the person, wherein:
the pose comprises a combination of a spatial orientation of the person and a spatial location of the person relative to the bounded real-world scene,
the tracking of the pose is performed using machine learning technology that has been trained based on a plurality of events that are similar to, and that have occurred prior to, the real-world event, and
the tracking of the pose includes at least one of:
tracking the particular body part for a frame of the 2D video image within which the particular body part is not depicted due to being occluded from a vantage point of the video capture device, and
differentiating the person from a body part of a different person present within the bounded real-world scene, the body part of the different person contiguous with the depiction of the person within a frame of the 2D video image due to being colinear with the person and a vantage point of the video capture device; and
generating, by the 3D simulation system and based on the tracked pose of the person and the 3D models of the bounded real-world scene and the person, a 3D simulation of the bounded real-world scene within which the person is simulated in accordance with the tracked pose of the person.

2. The method of claim 1, wherein the 3D models of the bounded real-world scene and the person are stored in and accessed from a storage repository accessible to the 3D simulation system.

3. The method of claim 1, further comprising:
identifying, by the 3D simulation system prior to the commencement of the real-world event, a fixed space within which the real-world event is confined;

defining, by the 3D simulation system based on the identified fixed space, a boundary of the bounded real-world scene; and
generating, by the 3D simulation system based on the defined boundary and prior to the commencement of the real-world event, the 3D model of the bounded real-world scene.

4. The method of claim 1, wherein:
the 2D video image is represented by color data that depicts the bounded real-world scene and the person during the real-world event; and
the tracking of the pose of the person is performed based exclusively on a set of data including the color data representing the 2D video image and excluding any depth data representative of the bounded real-world scene or the person.

5. The method of claim 1, wherein:
the method further comprises accessing, by the 3D simulation system prior to the commencement of the real-world event, additional 2D video images captured by additional video capture devices disposed at different vantage points in relation to the bounded real-world scene;
the additional 2D video images each depict the bounded real-world scene and the person using color data and depth data representative of the bounded real-world scene and the person; and
the 3D models of the bounded real-world scene and the person that are accessed for use during the real-world event are generated prior to the commencement of the real-world event based on the color data and the depth data from the additional 2D video images.

6. The method of claim 1, further comprising predicting, by the 3D simulation system at a first time and based on the 2D video image, the pose of the person as the pose of the person will be detected at a second time that occurs after the first time;
wherein the tracking of the pose of the person performed at the second time is based on the predicting of the pose of the person that was performed at the first time.

7. The method of claim 1, wherein:
the 2D video image captured by the video capture device depicts a plurality of real-world objects each of which is present within the bounded real-world scene and one of which is the person; and
along with the person, the plurality of real-world objects further includes an inanimate object that is used by the person.

8. The method of claim 1, embodied as computer-executable instructions on at least one non-transitory computer-readable medium.

9. The method of claim 1, wherein the tracking of the pose of the person further includes tracking, based on a depiction in the 2D video image of the person moving within the bounded real-world scene, a plurality of key points of a skeletal model of the person.

10. The method of claim 9, wherein the generating of the 3D simulation of the bounded real-world scene includes posing the 3D model of the person within the 3D model of the bounded real-world scene in accordance with the tracking of the plurality of key points.

11. A system comprising:
a memory storing instructions; and
a processor communicatively coupled to the memory and configured to execute the instructions to:
access a two-dimensional (2D) video image captured by a video capture device and depicting a real-world event involving a bounded real-world scene and a person present within the bounded real-world scene, the person having a plurality of body parts including a particular body part;
access a 3D model of the bounded real-world scene and a 3D model of the person, wherein the 3D model of the bounded real-world scene and the 3D model of the person are both preexisting 3D models generated prior to commencement of the real-world event and accessed for use during the real-world event;
track, based on the 2D video image, a pose of the person, wherein:
the pose comprises a combination of a spatial orientation of the person and a spatial location of the person relative to the bounded real-world scene,
the tracking of the pose is performed using machine learning technology that has been trained based on a plurality of events that are similar to, and that have occurred prior to, the real-world event, and
the tracking of the pose includes at least one of:
tracking the particular body part for a frame of the 2D video image within which the particular body part is not depicted due to being occluded from a vantage point of the video capture device, and
differentiating the person from a body part of a different person present within the bounded real-world scene, the body part of the different person contiguous with the depiction of the person within a frame of the 2D video image due to being colinear with the person and a vantage point of the video capture device; and
generate, based on the tracked pose of the person and the 3D models of the bounded real-world scene and the person, a 3D simulation of the bounded real-world scene within which the person is simulated in accordance with the tracked pose of the person.

12. The system of claim 11, wherein the 3D models of the bounded real-world scene and the person are stored in and accessed from a storage repository accessible to the system.

13. The system of claim 11, wherein the processor is further configured to execute the instructions to:
identify, prior to the commencement of the real-world event, a fixed space within which the real-world event is confined;
define, based on the identified fixed space, a boundary of the bounded real-world scene; and
generate, based on the defined boundary and prior to the commencement of the real-world event, the 3D model of the bounded real-world scene.

14. The system of claim 11, wherein:
the 2D video image is represented by color data that depicts the bounded real-world scene and the person during the real-world event; and
the tracking of the pose of the person is performed based exclusively on a set of data including the color data representing the 2D video image and excluding any depth data representative of the bounded real-world scene or the person.

15. The system of claim 11, wherein:
the processor is further configured to execute the instructions to access, prior to the commencement of the real-world event, additional 2D video images captured by additional video capture devices disposed at different vantage points in relation to the bounded real-world scene;

the additional 2D video images each depict the bounded real-world scene and the person using color data and depth data representative of the bounded real-world scene and the person; and the 3D models of the bounded real-world scene and the person that are accessed for use during the real-world event are generated prior to the commencement of the real-world event based on the color data and the depth data from the additional 2D video images.

16. The system of claim 11, wherein the processor is further configured to execute the instructions to predict, at a first time and based on the 2D video image, the pose of the person as the pose of the person will be detected at a second time that occurs after the first time;

wherein the tracking of the pose of the person performed at the second time is based on the predicting of the pose of the person that was performed at the first time.

17. The system of claim 11, wherein the tracking of the pose of the person further includes tracking, based on a depiction in the 2D video image of the person moving within the bounded real-world scene, a plurality of key points of a skeletal model of the person.

18. The system of claim 17, wherein the generating of the 3D simulation of the bounded real-world scene includes posing the 3D model of the person within the 3D model of the bounded real-world scene in accordance with the tracking of the plurality of key points.

\* \* \* \* \*